United States Patent

Rezek et al.

[11] Patent Number: 5,956,256
[45] Date of Patent: Sep. 21, 1999

[54] METHOD AND APPARATUS FOR OPTIMIZING A CIRCUIT DESIGN HAVING MULTI-PATHS THEREIN

[75] Inventors: James E. Rezek; Kevin C. Cleereman, both of Mounds View; Kenneth E. Merryman, Fridley; Kenneth L. Engelbrecht, Blaine, all of Minn.

[73] Assignee: Unisys Corporation, Blue Bell, Pa.

[21] Appl. No.: 08/752,618

[22] Filed: Nov. 19, 1996

[51] Int. Cl.⁶ .................................. G06F 17/50
[52] U.S. Cl. ................................................ 364/489
[58] Field of Search ................................. 364/488, 489, 364/490, 491; 395/551, 552, 555, 556, 558

[56] References Cited

U.S. PATENT DOCUMENTS

| | | | |
|---|---|---|---|
| 4,758,953 | 7/1988 | Morita et al. | 364/300 |
| 4,831,543 | 5/1989 | Mastellone | 364/489 |
| 4,918,614 | 4/1990 | Modarres et al. | 364/490 |
| 5,050,091 | 9/1991 | Rubin | 364/488 |
| 5,164,908 | 11/1992 | Igarashi | 364/491 |
| 5,175,696 | 12/1992 | Hooper et al. | 364/489 |
| 5,191,541 | 3/1993 | Landman et al. | 364/489 |
| 5,222,029 | 6/1993 | Hooper et al. | 364/489 |
| 5,255,363 | 10/1993 | Seyler | 395/164 |
| 5,267,175 | 11/1993 | Hooper | 364/489 |
| 5,341,309 | 8/1994 | Kawata | 364/489 |
| 5,349,659 | 9/1994 | Do et al. | 395/700 |
| 5,355,317 | 10/1994 | Talbott et al. | 384/468 |
| 5,357,440 | 10/1994 | Talbott et al. | 364/467 |
| 5,359,523 | 10/1994 | Talbott et al. | 364/468 |
| 5,359,537 | 10/1994 | Saucier et al. | 364/489 |
| 5,361,357 | 11/1994 | Kionka | 395/700 |
| 5,398,195 | 3/1995 | Kim | 364/489 |
| 5,406,497 | 4/1995 | Altheimer et al. | 364/489 |
| 5,416,721 | 5/1995 | Nishiyama et al. | 364/491 |
| 5,418,733 | 5/1995 | Kamijima | 364/490 |
| 5,418,954 | 5/1995 | Petrus | 395/700 |
| 5,440,720 | 8/1995 | Baisuck et al. | 395/500 |
| 5,448,497 | 9/1995 | Ashar et al. | 364/489 |
| 5,452,239 | 9/1995 | Dai et al. | 364/578 |
| 5,455,931 | 10/1995 | Camporese et al. | 395/550 |
| 5,483,461 | 1/1996 | Lee et al. | 364/490 |
| 5,485,396 | 1/1996 | Brasen et al. | 364/491 |
| 5,490,266 | 2/1996 | Sturges | 395/500 |
| 5,490,268 | 2/1996 | Matsunaga | 395/550 |
| 5,491,640 | 2/1996 | Sharma et al. | 364/488 |
| 5,493,508 | 2/1996 | Dangelo et al. | 364/489 |
| 5,507,029 | 4/1996 | Granato et al. | 395/500 |
| 5,517,638 | 5/1996 | Szczepanek | 395/550 |
| 5,579,510 | 11/1996 | Wang et al. | 395/500 |
| 5,600,567 | 2/1997 | Kucukcakar et al. | 364/488 |
| 5,600,824 | 2/1997 | Williams et al. | 395/551 |
| 5,644,499 | 7/1997 | Ishii | 364/489 |
| 5,684,808 | 11/1997 | Valind | 371/22.3 |
| 5,708,801 | 1/1998 | Williams et al. | 395/551 |

OTHER PUBLICATIONS

Tufte, "CML III Bipolar Standard Cell Library", Proceedings of the 1988 Bipolar Circuits and Technology Meeting, Minneapolis, Minnesota, Sep., 1988, pp. 180–182.

*Primary Examiner*—Kevin J. Teska
*Assistant Examiner*—Leigh Marie Garbowski
*Attorney, Agent, or Firm*—Charles A. Johnson; Mark T. Starr; Crompton, Seager & Tufte, LLC

[57] ABSTRACT

A method and apparatus for optimizing a circuit design having multi-cycle paths therein. In an exemplary embodiment, a circuit design having a number of multi-cycle paths may be optimized by: identifying at least one of the number of multi-cycle paths within the circuit design, and identifying the corresponding qualified clocks associated therewith; replacing selected ones of the corresponding clocks with replacement clocks; and optimizing the circuit design using the replacement clocks. By using a replacement clock that has a clock period equal to the corresponding clock, which is typically a qualified clock, a standard optimization tool may correctly optimize the circuit design.

32 Claims, 23 Drawing Sheets

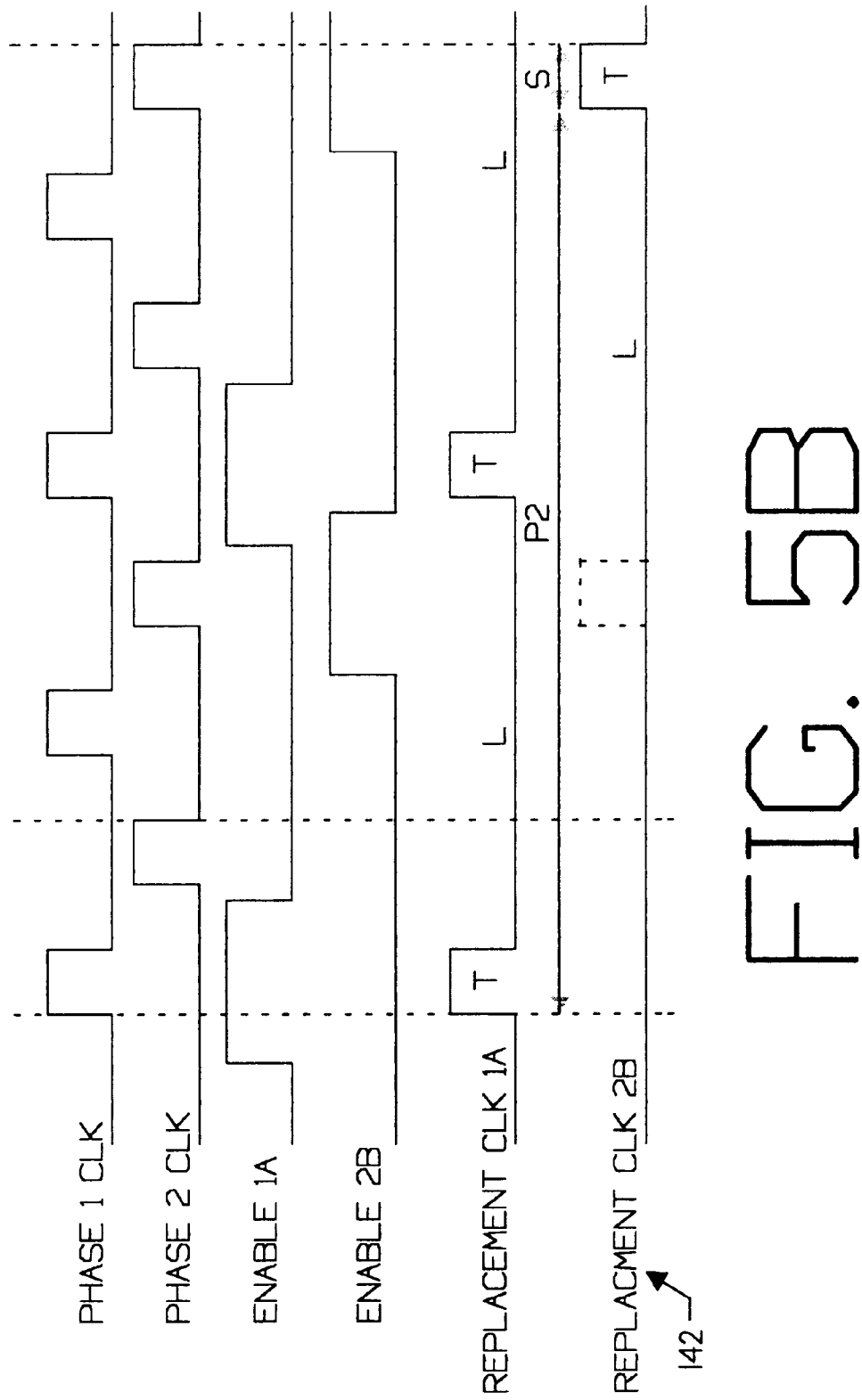

FIG. 9B

EXAMPLE PRIOR ART TIMING CONSTRAINTS STORED FOR MODULE-B

| CLOCK PHASE | DELAY TO MODULE-B |
|---|---|
| PHASE 1A CLK | DELAY-A |

EXAMPLE TIMING CONSTRAINTS STORED FOR MODULE-B IN ACCORDANCE WITH THE PRESENT INVENTION

| CLOCK PHASE | DELAY TO MODULE-B | DEST CLOCK CYCLE |
|---|---|---|
| PHASE 1A CLK | DELAY-A | 2 |

FURTHER EXAMPLARY TIMING CONSTRAINTS STORED FOR MODULE-B IN ACCORDANCE WITH THE PRESENT INVENTION

| SRC LATCH | DESTIN LATCH | SOURCE CLOCK PHASE | DESTIN CLOCK PHASE | DELAY TO MOD-B | DST CLK CYCL |
|---|---|---|---|---|---|
| LATCH A | LATCH B | PHASE 1A CLK | QUAL PHASE 2B CLK | DELAY-A | 2 |

METHOD AND APPARATUS FOR OPTIMIZING A CIRCUIT DESIGN HAVING MULTI-PATHS THEREIN

CROSS REFERENCE TO CO-PENDING APPLICATIONS

The present application is related to U.S. patent application Ser. No. 08/524,017, filed Aug. 29, 1995, entitled "A Method of Stabilizing Component and Net Names of Integrated Circuits In Electronic Design Automation Systems", U.S. patent application Ser. No. 08/752,620, filed Nov. 19, 1996, entitled "Method and Apparatus for Optimizing a Gated Clock Structure Using a Standard Optimization Tool", U.S. patent application Ser. No. 08/752,617, filed Nov. 19, 1996, entitled "Method and Apparatus for Incrementally Optimizing a Circuit Design", U.S. patent application Ser. No. 08/752,619, filed Nov. 19, 1996, entitled "Method and Apparatus For Providing Optimization Parameters to a Logic Optimizer Tool", U.S. patent application Ser. No. 08/752,616, filed Nov. 19, 1996, entitled "Method and Apparatus for Identifying Gated Clocks Within a Circuit Design Using a Standard Optimization Tool", U.S. patent application Ser. No. 08/752,621, filed Nov. 19, 1996, entitled "Method and Apparatus for Monitoring the Performance of a Circuit Optimization Tool", all assigned to the assignee of the present invention, and all incorporated herein by reference.

BACKGROUND OF THE INVENTION

1. Field of the Invention

This invention relates generally to electronic design automation (EDA) systems used for designing integrated circuits. The invention is more specifically related to a method and apparatus for optimizing a circuit design having multi-cycle paths therein.

2. Description of the Prior Art

The design process for all integrated circuits is composed of several discrete operations. Initially, the proposed functionality for a circuit is analyzed by one or more chip designers. These designers define the logical components of the circuit and their interactions by specifying the logic design using design capture tools. These design capture tools are commonly implemented in software executing on an engineering workstation, with well-known input devices being used to receive design information from the chip designer, and output devices, such as computer displays, being used to provide visual feedback of the design to the designer as it is being constructed. Such software is typically implemented as part of an electronic design automation (EDA) system. Specifically, the design entry operation involves generating a description of the logic design to be implemented on the circuit chip in an appropriate machine-readable form. Chip designers generally employ hierarchial design techniques to determine the appropriate selection and interconnection of logic and/or memory devices which will enable the chip to perform the desired function. These techniques involve describing the chip's functionality at various levels of abstraction, ranging from the most general function performed by the chip to the precise functions performed by each logic and/or memory element on the chip.

A common method for specifying the integrated circuit design is the use of hardware description languages. This method allows a circuit designer to specify the circuit at the register transfer level (also known as a "behavior description"). Using this method, the circuit is defined in small building blocks. The names of the building blocks are specified by the circuit designer. Thus, they usually are logical names with specific functional meaning.

Encoding the design in a hardware description language (HDL) is a major design entry technique used to specify modern integrated circuits. Hardware description languages are specifically developed to aid a designer in describing a circuit. These languages often contain specific functions and syntax to allow complex hardware structures to be described in a compact and efficient way.

It is useful to distinguish between those components of an integrated circuit design called cells, provided by a silicon chip vendor as primitive cells (i.e., leaf candidates), and the user-defined hierarchy blocks built upon them. One way is to speak of a "cell library" vs. a "design library" as two separate libraries, both of which are available to subsequent designs. Alternatively, at least initially, a design library contains a cell library. A cell library is a database containing detailed specifications on the characteristics of each logical component available for use in a design. Initial cell library contents are usually provided by the chip vendor. The components in the cell library are identified by the generic description of the component type. For example, the term "NAND" for a NAND gate is its type description and distinguishes this component from others such as OR gates, flip-flops, multiplexors, and so on. A two-input NAND gate might be of type 2NAND., When a 2NAND component is specified as part of a given circuit design, it is given an instance name, to distinguish it from all other 2NAND gates used in the circuit. The instance name typically includes the instance names of all parent instances by concatenation when defining the instance in the context of the chip.

A single name is sufficient when dealing only in the context of a single user function. The user-defined blocks can then be used to design larger blocks of greater complexity. The user-defined blocks are added to the design library, which grows from the additions of new design modules as the design evolves. The top level of the design hierarchy may be a single block that defines the entire design, and the bottom layer of the hierarchy may consist of leaf cells, the cells (i.e., the logical components) that were originally provided in the cell library. The resulting design is often called a detailed (or gate-level) description of the logic design.

The generation of the detailed description is often accomplished by logic design synthesis software for HDL entry. The logic design synthesis software generates a gate-level description of user-defined input and output logic, and also creates new gate-level logic to implement user-defined logical functions. Typically, the logic design synthesis software is executed many times during the integrated circuit design process, because errors may be detected during the simulation and testing phases of the design cycle and then fixed in the behavioral description.

The output of the design capture and synthesis tools is typically a logic design database which completely specifies the logical and functional relationships among the components of the design. Once the design has been converted into this form, it may be optimized by sending the logic design database to a logic optimizer tool typically implemented in software.

In many logic optimizer tools, the optimization process may include a characterization step and an optimization step. During the characterization step, various optimization parameters are assigned to selected portions of the design. For example, for those portions of the design that are to be optimized for timing, the characterization step may perform a timing analysis of the design, and identify critical paths within the design that need to be improved by optimization. The characterization step may then assign timing constraints to those portions of the design, indicating the degree that they must be optimized to meet the desired timing goals. Because of the size of many designs, the characterization and optimization steps typically only operate on one module of the design at any given time. As such, the characterization step may assign timing constraints to the selected module, based upon the circuitry interfacing therewith. The module that the tools is currently operating on may be termed the local module, while all other modules may be termed remote modules.

After the characterization step is complete, the optimizer tool may perform an optimization step. The optimization step typically attempts to optimize the design such that all of the timing constraints assigned by the characterization step are satisfied. During the optimization step, the logic optimizer may, for example, remove logic from the design that is unnecessary, minimize the logic that is necessary to implement certain functions, increase the power of selected cells to improve performance, etc.

After the design has been optimized, the circuit designers typically verify that the resulting logic definition is correct and that the integrated circuit implements the expected function. This verification is currently achieved by timing and simulation software tools. The design undergoes design verification analysis in order to detect flaws in the design. The design is also analyzed by simulating the design to assess the functionality of the design. If errors are found or the resulting functionality is unacceptable, the designer modifies the behavior description as needed. These design iterations help to ensure that the design satisfies the desired requirements.

After timing verifications and functional simulation have been completed, placement and routing of the design's components is performed. These steps involve allocating components of the design to locations on the integrated circuit chip and interconnecting the components to form nets. Finally, final timing verification is performed after placement and routing is complete.

A problem in the above design process may occur when multi-cycle paths are incorporated into a design. Multi-cycle paths are data paths that have a propagation time that is longer than the clock period of an available clock signal. To accommodate the multi-cycle paths, a corresponding clock signal may be gated with a functional enable signal, thereby qualifying the clock signal. The functional enable signals may select which clock pulse of the corresponding clock signal is activated, and thus may functionally select at which clock cycle of the corresponding clock that new data is latched into a corresponding state device. This may allow the system to selectively make multi-cycle decisions.

Multi-cycle paths are particularly useful in high performance systems. In some systems, the clock periods are set to accommodate the worst case propagation time within the system. However, it has been found that to maximize performance, it may be desirable to set the raw clock period such that only the faster operations are accommodated, and the slower operations are allowed to be completed during a multi-cycle decision using a gated clocking scheme.

Typical logic optimizer tools cannot handle multi-cycle path designs, particularly when the source and destination state devices are located in separate modules within the design, and are optimized separately. As discussed more fully in co-pending U.S. patent application Ser. No. 08/752,616, filed Nov. 19, 1996, entitled "Method and Apparatus for Identifying Gated Clocks Within a Circuit Design Using a Standard Optimization Tool", typical logic optimizer tools may not properly identify gated clocks, and may thus incorrectly associate a particular clock signal with each state device, rather than the correct qualified clock signal. This may prohibit the proper optimization of a design that includes multi-cycle paths.

In addition to the above, and because logic optimizer tools typically only operate on a single module of a design at any given time, critical timing information may be lost. For example, for some logic optimizer tools, the only timing information passed from a remote module to a local module, via the characterization step discussed above, is the clock phase of the source latch and the worst case delay from the source latch to the boundary of local module. However, it may be necessary to further indicate which paths extending between the remote module and the local module are multi-cycle paths, and how many cycles are allowed for each path. Without this information, the multi-cycle paths may be improperly optimized and/or false errors may be reported by the logic optimizer tool.

SUMMARY OF THE INVENTION

The present invention overcomes many of the disadvantages of the prior art by providing a method and apparatus for optimizing a circuit design having multi-cycle paths, wherein selected multi-cycle paths have a corresponding clock signal that is only effective on selected clock pulses. This is accomplished by, for example, providing a separate apparatus or tool to identify the clocks that are associated with multi-cycle paths and provide related clock information to a standard optimization tool, or by modifying a standard optimization tool to properly identify the clocks that are associated with multi-cycle paths within the circuit design.

In an exemplary embodiment, a circuit design having a number of multi-cycle paths may be optimized by identifying at least one of the number of clocks that are associated with a multi-cycle path, and replacing those identified clocks with a replacement clock. The identified clocks are typically qualified clocks, and are generated by gating a clock signal with a functional enable signal. The replacement clocks may have a clock period that is equal to the corresponding qualified clock signal. The circuit design may then be optimized using the replacement clock, rather than attempting to model the original qualified clock paths.

It is contemplated that the present invention may identify those clocks that are associated with multi-cycle paths by examining a number of timing notes. The number of timing notes may indicate which of the number of clocks within the circuit design correspond to a multi-cycle path. The number of timing notes may be generated either automatically, or manually. In a preferred embodiment, the timing notes are generated manually by a circuit designer. In either case, the timing notes may indicate which paths within the design are multi-cycle paths, and may further indicate how many of the corresponding clock cycles are required for each path. Thereafter, the corresponding clock signals may be identified, and a replacement clock having a proper clock period may be substituted therefor. The circuit design may then be optimized using the replacement clocks, rather than the original qualified clocks.

For a circuit design having a source state device located in a first module and a destination state device located in a second module, it is contemplated that the optimization of the circuit design may include the steps of: determining a remote propagation time by determining a delay along the path from the source state device to the boundary of the local module, determining a local propagation time by determining a delay along the path from the boundary of the local module to the destination state device, determining an allowed path propagation time by determining a delay between a predetermined portion of the clock pulse of the source clock and a predetermined portion of a replacement clock, determining an allowed local propagation time by subtracting the remote propagation time from the allowed total propagation time, comparing the allowed local propagation time with the actual local propagation time, and optimizing the portion of the path that lies in the local module if the local propagation time exceeds the allowed local propagation time by a predetermined amount.

In an alternative embodiment, and rather than replacing the clocks that are associated with multi-cycle paths with a replacement clock, it is contemplated that the circuit design may be optimized by: storing a number of timing constraints wherein the, number of timing constraints associate a selected clock pulse of a destination clock with the path extending between a source state device and a destination state device; determining a remote propagation time by determining a delay along the path from the source state device to the boundary of the local module; determining a local propagation time by determining a delay along the path from the boundary of the local module to the destination state device; determining an allowed total propagation time by determining a delay between a predetermined portion of the clock pulse of the source clock and a predetermined portion of a selected clock pulse of the destination clock; determining an allowed local propagation time by subtracting the remote propagation time from the allowed total propagation time; comparing the allowed local propagation time with the local propagation time; and optimizing the portion of the path that lies in the local module if the local propagation time exceeds the allowed local propagation time by a predetermined amount.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 5B is a timing diagram showing the critical timing parameters for the diagram shown in FIG. 5A;

FIG. 9B is a table showing exemplary prior art timing constraints stored for Module-B of FIG. 9A;

FIG. 9C is a table showing exemplary timing constraints stored for Module-B of FIG. 9A, in accordance with the present invention;

FIG. 9D is a table,showing further exemplary timing constraints stored for Module-B of FIG. 9A, in accordance with the present invention;

DETAILED DESCRIPTION OF THE PREFERRED EMBODIMENTS

Figure 1:
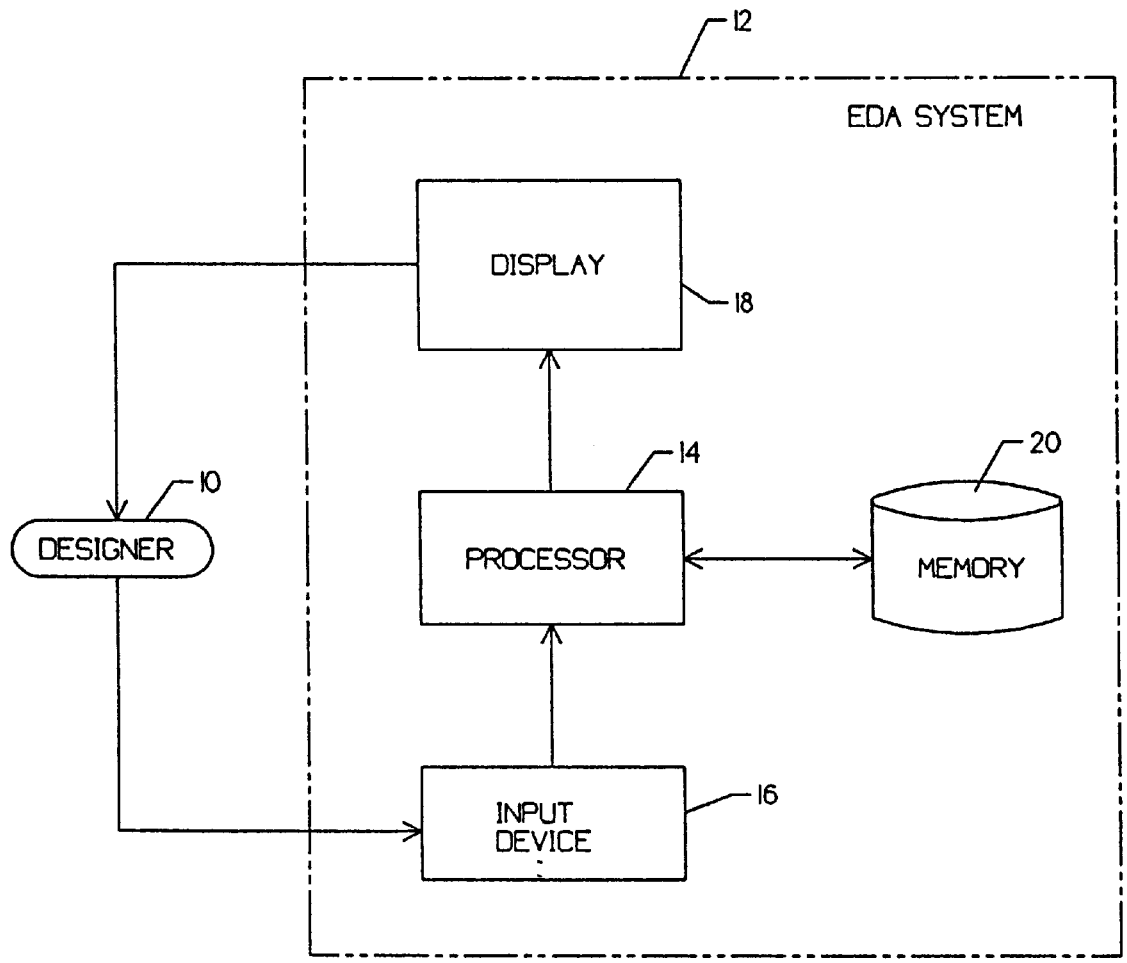
FIG. 1 is a block diagram of the computer-based environment of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

In sum, the present invention preferably is implemented for practice by a computer, e.g., a source code expression of the present invention is input to the computer to control operations therein. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system can be made for many reasons.

FIG. 1 is a block diagram of the computer-based environment of the present invention. A Designer 10 interacts with an Electronic Design Automation (EDA) System 12 to enter an integrated circuit design, validate the design, place the design's components on a chip, and route the interconnections among the components. The integrated circuit may be an application specific integrated circuit (ASIC). The EDA System 12 includes a Processor 14, which executes operating system software as well as application programs known as EDA software. The Processor is found in all general purpose computers and almost all special purpose computers. The EDA System 12 is intended to be representative of a category of data processors suitable for supporting EDA operations. In the preferred embodiment, the EDA System is a HP A1097C Series 700 engineering workstation, commercially available from Hewlett-Packard Corporation, although other engineering workstations or computer systems from manufacturers such as Sun Microsystems, Inc. may also be used.

The Designer 10 enters design information into the EDA System by using a well-known Input Device 16 such as a mouse, keyboard, or a combination of the two devices. It should be understood, however, that the Input Device may actually consist of a card reader, magnetic or paper tape reader, or other well-known input device (including another computer system). A mouse or other cursor control device is typically used as an Input Device as a convenient means to input information to the EDA System to select command modes, edit input data, and the like. Visual feedback of the design process is given to the Designer by showing the design being constructed as graphical symbols on Display 18. The Display is used to display messages and symbols to the Designer. Such a Display 18 may take the form of any of several well-known varieties of CRT displays. The EDA software being executed by the Processor 14 stores information relating to logic design in Memory 20. The Memory may take the form of a semiconductor memory, magnetic disks, optical disks, magnetic tape or other mass storage device.

Figure 2:
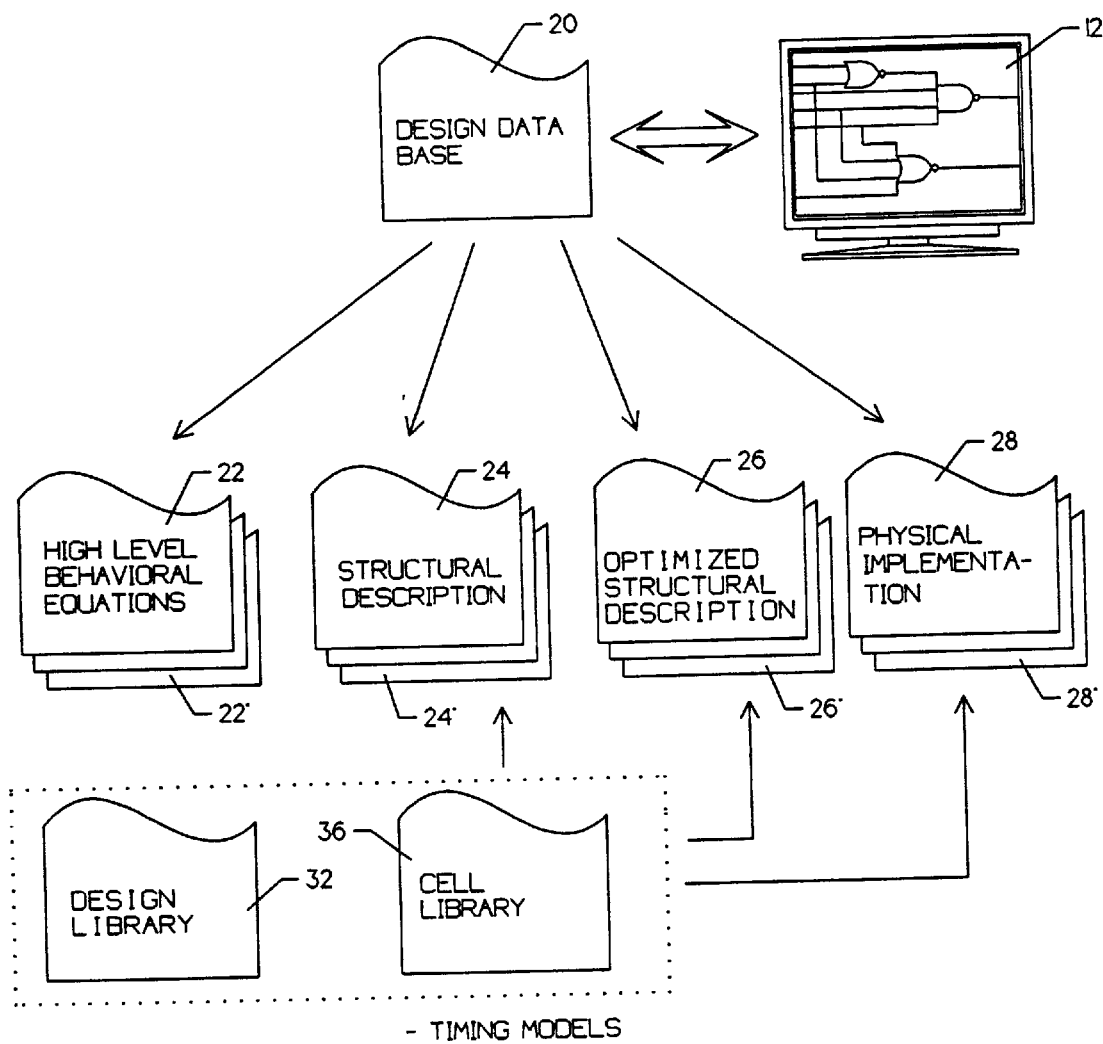
FIG. 2 is a block diagram showing typical circuit representations stored within a circuit design database.

FIG. 2 is a block diagram showing a number of circuit representations stored within a typical circuit design database. The design database 20 may include a high level behavioral representation 22, a structural description representation 24, an optimized structural representation 26, and a physical representation 28. Further, the database may include previous revisions of the high level behavioral representation 22', a structural description representation 24', an optimized structural representation 26', and a physical representation 28'.

As indicated above, the circuit designer typically specifies the logic design of an integrated circuit by using design capture software that runs on an EDA system 12. In the preferred embodiment, the Hardware Computer-Aided Design System (HCADS), available from Unisys Corporation, is used as Design Capture software, although other design capture programs from companies such as Cadence Design Systems, Inc., Synopsys, Inc., and Mentor Graphics, Inc., are also commercially available. At a minimum, when using a hardware description language, any text editor program may be used to specify the design. The result of this activity is a high level behavior description representation 22, which typically represents the logic design as specified at the register transfer level. Items in the high level behavior description representation 22 may map to functional components of the design. In the preferred embodiment, the high level behavior description representation 22 is written in a design language called Universal Design Source Language (UDSL), although other existing, well-known hardware design languages could also be used.

The high level behavior description representation 22 may be input to a logic design synthesis tool. The logic design synthesis tool may assign the gates and other circuitry needed to implement the functions specified by the high level behavior description representation 22. In the preferred embodiment, the synthesis software is the Behavior to Structure Translator (BEST) synthesis tool developed by Unisys Corporation. However, alternate embodiments such as the VHDL Design Compiler commercially available from Synopsys, Inc., the DesignBook Synthesis tool from Escalade, and the Synergy synthesis tool available from Cadence Design Systems, Inc. may also be used.

The Logic Design Synthesis tool may output a structural description representation 24, which is sometimes referred to as the netlist for the design. This file contains the gate-level definition of the logic design. The structural description representation 24 may be in the Prime Behavior Description Language ('BDL), a format developed and used by the Unisys Corporation.

The structural description representation 24 may be provided to other EDA software programs, including an optimization program. The circuit optimization program may read the structural description representation 24 and optimize the logic represented therein. Typically, the optimization tool may read and write Electronic Data Interchange Format (EDIF) files. The EDIF format is an industry standard format for hardware design language information. Thus, embedded within a typical optimization program is an EDIF reader and an EDIF writer. The EDIF writer and reader translate the circuit design database 20 from an internal format to and from the EDIF format.

The optimization methodology used by the optimization program may be selectable by the user. For example, the user may direct the optimization tool to optimize a particular portion of the circuit design such that power, area, speed or other predefined parameters are optimized.

The optimization program may optimize the structural description representation 24 using components from a selected cell library 30 or design library 32. The optimization program may provide an optimized structural description representation, as shown at 26. In the preferred embodiment, the optimization program is the Design Compiler, commercially available from Synopsys, Inc.

The optimized structural description representation 26 may then be placed and routed using a commercially available place and route tool. In the preferred embodiment, the place and route tool is provided by Cadence Design Systems, Inc. is utilized, although other firms active in the electronic design automation (EDA) industry all sell systems similar in function to the above-mentioned Cadence tool.

The result may be stored in the circuit design database 20 as a physical implementation representation 28. Typical cell libraries include a number of representation of each component therein including a symbol representation, a schematic representation and a physical representation. This may also be true for selected components in the design library 32. The physical implementation representation 28 of the circuit design database 20 typically includes references to the physical representation of the library components referenced therein.

Figure 3:
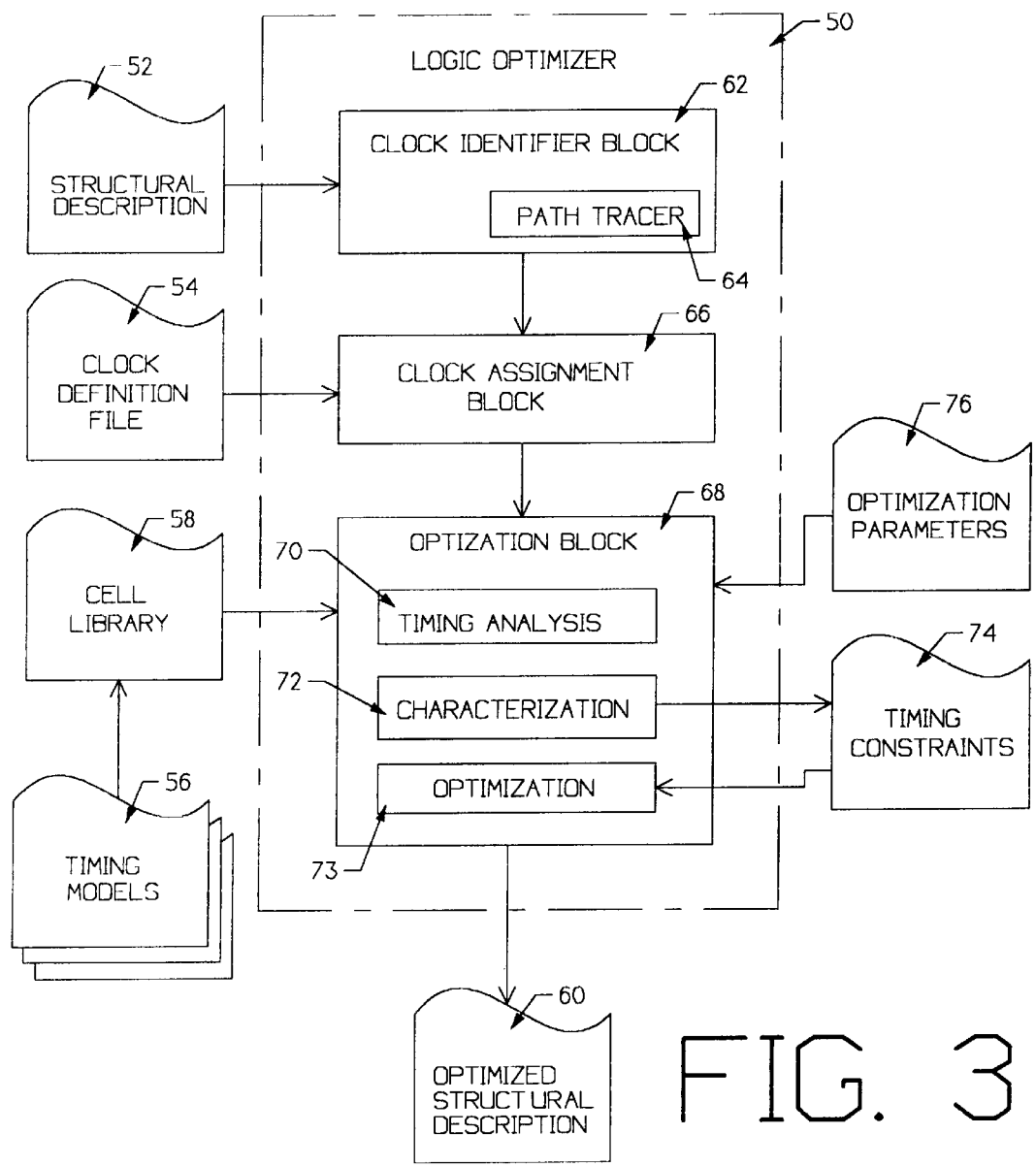
FIG. 3 is a block diagram that illustrates the operation of a standard optimization program.

FIG. 3 is a block diagram that illustrates the operation of a standard optimization tool 50. The standard optimization tool 50 may read a structural description 52 of a desired circuit design. The standard optimization tool 50 may further read a clock definition file 54, and timing models 56 from cell library 58, as shown. The standard optimization tool 50 may then optimize the design and provide an optimized structural description 60.

More specifically, the standard optimization tool 50 may include a clock identifier block 62 for identifying which of a number of clocks are associated with each state device within the circuit design. The clock identifier block 62 may include a path tracer capability 64, for tracing from pre-identified clock nets to corresponding state devices within the circuit design. The clock identifier block may then record which clock is associated with each state device.

The standard optimization tool 50 may further include a clock assignment block 66 for assigning a particular clock waveform to each state device in the circuit design. Clock assignment block 66 may receive the clock/state device correspondence information from the clock identifier block 62, as shown. Further, the clock assignment block 66 may receive predetermined clock definition information from a clock definition file 54. The clock definition file 54 may define the waveform for each of the number of clock signals, including the clock period and duty cycle thereof. The clock assignment block 66 may thus assign a particular clock waveform to each of the state devices within the circuit design, depending on the clock that is associated therewith, and the waveform defined for that particular clock signal.

The circuit design and the clocking information may then be provided to optimization block 68. Optimization block 68 may include a timing analysis block 70, a characterization block 72, and an optimization block 73. The timing analysis block 70 may read the structural description 52, as described above. Typically, the structural description 52 describes the design using components from cell library 58. Thus, the timing analysis block 70 may read the necessary timing models 56 for each of the components from cell library 58. The timing analysis block 70 may then perform a timing analysis of the design and identify the critical paths therein.

The characterization block 72 may read the results of the timing analysis block 70 and assigns various optimization parameters 76 to selected portions of the design. For example, for those portions of the design that are to be optimized for timing, the characterization block 72 may assign timing constraints 74 to those portions of the design that lie in the critical paths. The timing constraints 74 may be generated by examining the clocking information for each source/destination state device in the design, and may be necessary to determine the overall path delay between state devices.

The timing constraints 74 assigned by the characterization block 72 typically indicate the degree that each of the associated portions of the design must be optimized to meet the desired timing goals of the overall design.

In addition, the user may supply various optimization parameters 76 to help control the optimization of the design. For example, the user may identify various blocks that are to be optimized for performance, power, etc., or not optimized at all.

Optimization block 73 may read the timing constraints 74, and attempt to optimize the design such that all of the timing constraints assigned by the characterization block 72 are satisfied. During optimization, the optimization block 73 may, for example, eliminate redundant logic, minimize logic implementation, increase the power of selected cells to improve performance, etc. After optimization, the optimization block 73 may provide an optimized structural description 60, as shown.

Figure 4A:
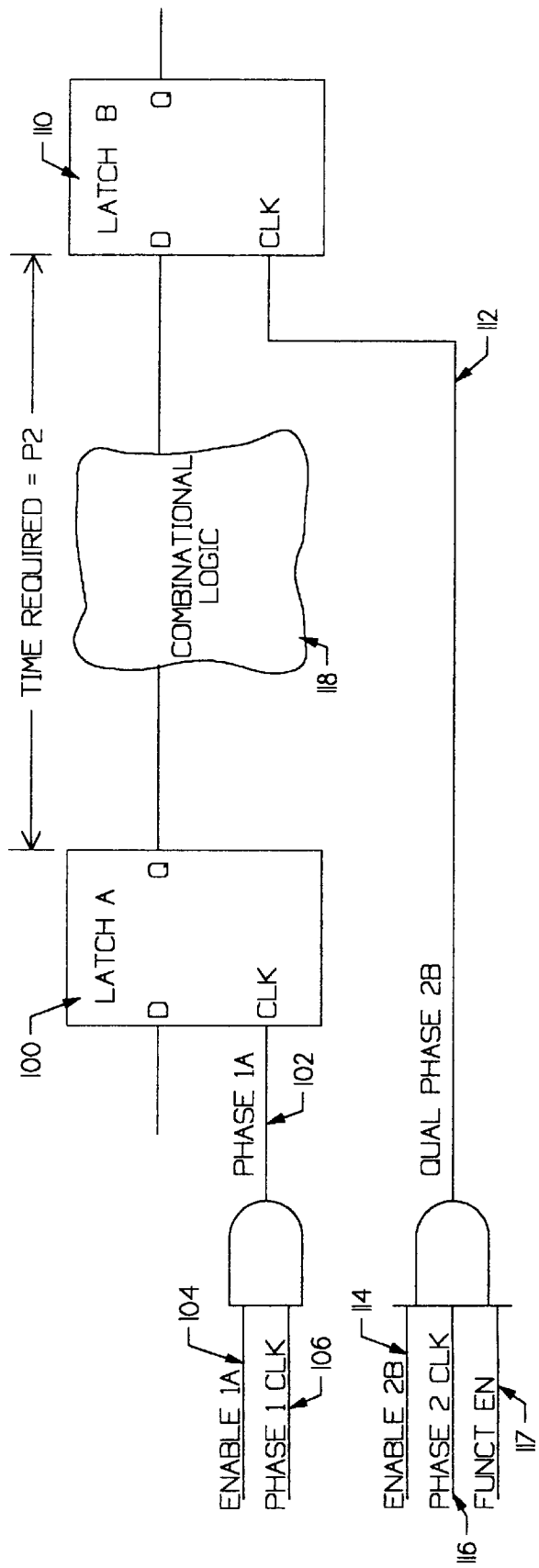
FIG. 4A illustrates a source latch and a destination latch with a qualified clock.

FIG. 4A illustrates a source latch and a destination latch with a qualified clock, and the critical timing parameters therefor. A source latch 100 is shown having a gated clock signal 102 provided thereto. The gated clock signal 102 is generated by anding an enable signal enable 1A 104 and a raw clock signal phase 1 clock signal 106. Similarly, a destination latch 110 is shown having a qualified clock signal 112 provided thereto. The qualified clock signal 112 is generated by anding an enable 2B signal 114, a raw clock signal phase 2 clock signal 116, and a functional enable signal 117. The functional enable signal selects which cycle of the phase 2B clock signal (see FIG. 4B) is activated. The source latch 100 provides data to the destination latch 110 through combinational logic 118, as shown.

Figure 4B:
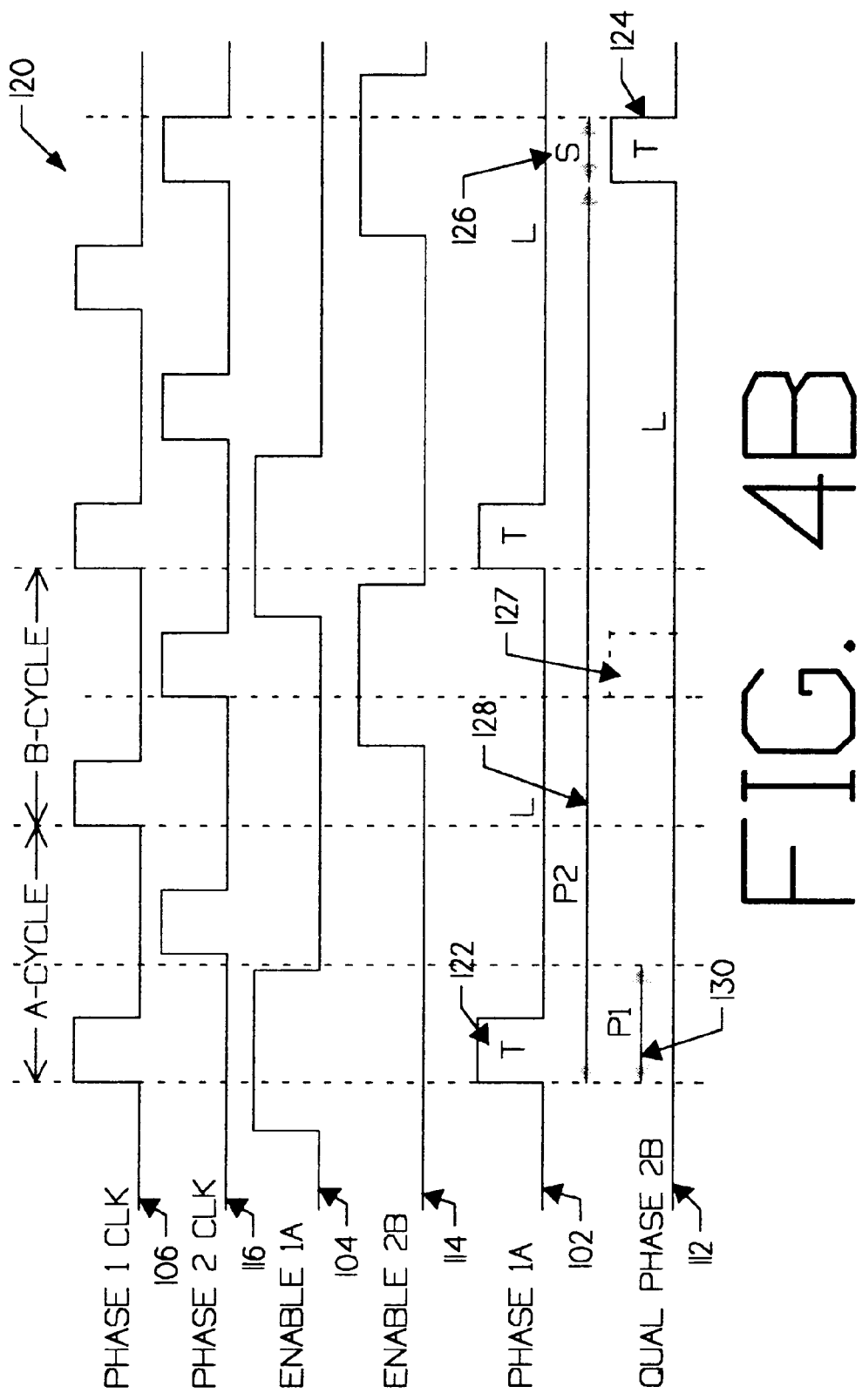
FIG. 4B illustrates the timing parameters for the diagram shown in FIG. 4A.

Referring to FIG. 4B, phase 1A clock signal 102 is asserted as shown at 122, wherein latch 100 becomes transparent, thereby releasing data through combinational logic 118 to the data input of latch 110. Qualified phase 2B clock signal 112 is pulsed as shown at 124, thereby capturing the data released by latch 100. In the illustrative embodiment, the functional enable signal 117 is controlled such that the qualified phase 2B clock signal 112 skips one clock pulse 127 (i.e. one clock cycle) of the phase 2B clock signal. Thus, the data released by latch 100 must arrive at latch 110 before latch 110 becomes latched as shown at 124 minus a setup time 126. This delay is shown by propagation delay 128.

As indicated in co-pending U.S. patent application Ser. No. 08/752,616, filed Nov. 19, 1996, entitled "Method and Apparatus for Identifying Qualified clocks Within a Circuit Design Using a Standard Optimization Tool", standard optimizer tools may provide a tracing capability to identify which state devices correspond to which clock signals. However, a limitation of this clock identifying method is that the tracing scheme provided by the logic optimizer tool may not be optimized for designs that have multi-cycle paths. That is, when the raw clock signals phase-1 clock 106 and phase-2 clock 116 are traced to the corresponding state devices 100 and 110, respectively, the clock enable signals enable 1A 104, enable 2B 114, and the functional enable signal 117 may not be identified or taken into account. Accordingly, the above-referenced clock tracing scheme may incorrectly associate a raw clock signal which each state device, rather than the correct qualified clock signal. That is, the above-referenced clock tracing scheme may identify raw clock signal phase-1 clk 106 with latch 100, rather than gated clock signal phase 1A 102. Similarly, the above-referenced clock tracing scheme may identify raw clock signal phase 2 116 with latch 110, rather than qualified clock signal qual phase 2B 112. This may cause the optimizer program to incorrectly optimize the design. For example, and because the "raw" clock signals may be associated with latches 100 and 102, the logic optimizer tool may attempt to increase the performance of combinational logic block 118 such that the data released from latch 100 reaches latch 110 before the raw clock signal phase-2 clk 116 is pulsed, as shown at 130. As can readily be seen, improperly associating a raw clock signal, rather than a gated or qualified signal, with a corresponding latch element may cause the logic optimizer tool to incorrectly optimize the design, or provide a false error to the user.

As described above, the functional enable signal 117 may be controlled to select a particular pulse of the phase 2B clock signal, thereby providing the qualified phase 2B signal 112. This may allow the system to selectively make multi-cycle decisions, depending on the particular source/destination state device combination. The generation of the functional enable signal 117 is typically controlled by an enable generation block or equivalent, and may be microcode controlled. Thus, the state of the functional enable signal 117 may be dependent on the particular combination of input signals provided to the circuit design. This may make it difficult to predict the state of the functional enable signal 117 under all conditions without providing a complete set of test vectors to the circuit design. This may be in conflict with many logic optimizer tools, as static timing analysis techniques are typically used.

Figure 5A:
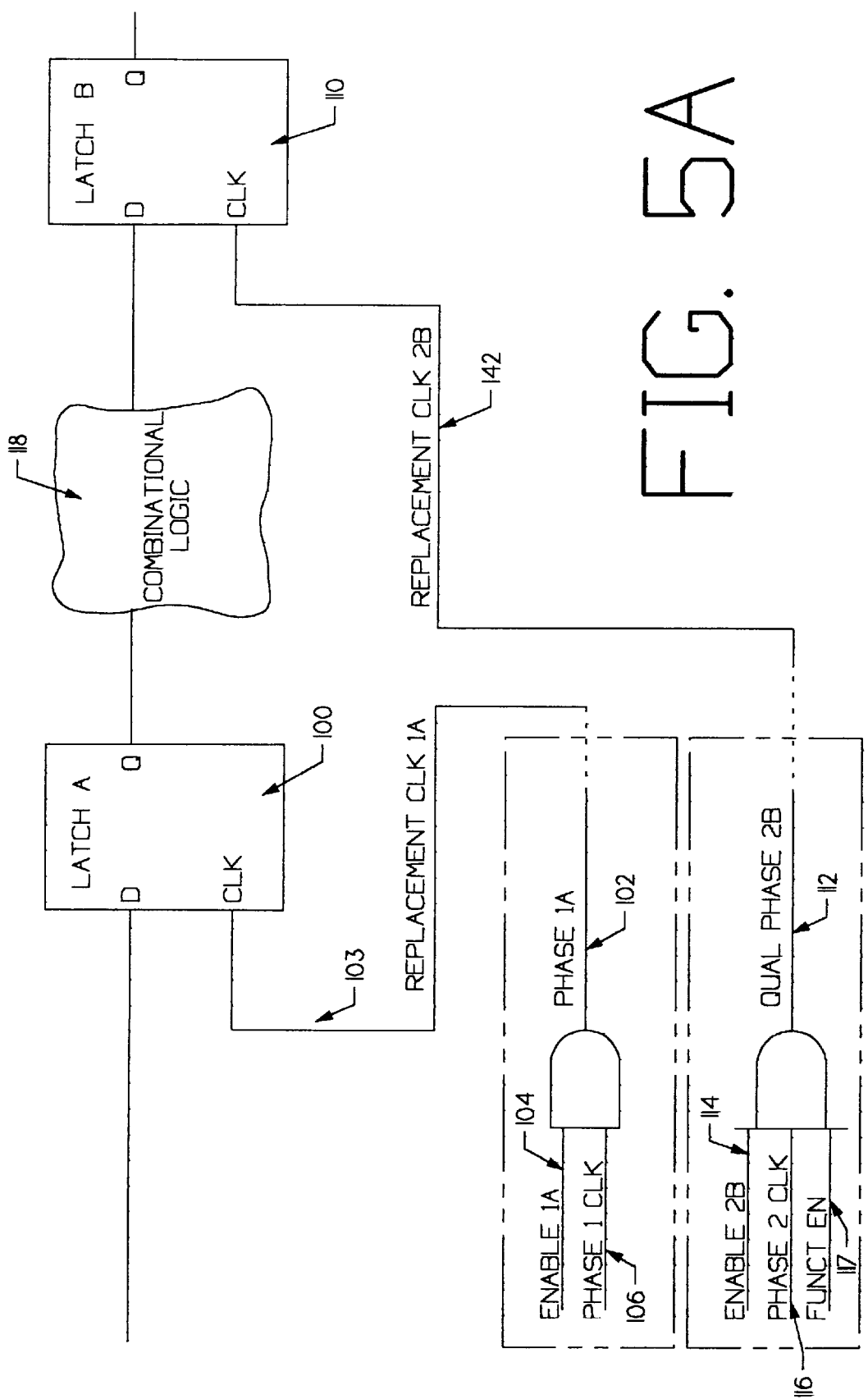
FIG. 5A illustrates a source latch and a destination latch with a replacement clock assigned thereto.

FIG. 5A illustrates a source latch 100 and a destination latch 110 with a replacement clock assigned thereto. Rather than attempting to model the logic that generates the functional enable signal 117, the embodiment shown in FIG. 5A contemplates replacing the qualified clock signal 112 with replacement clock 142, as shown.

Figure 5C:
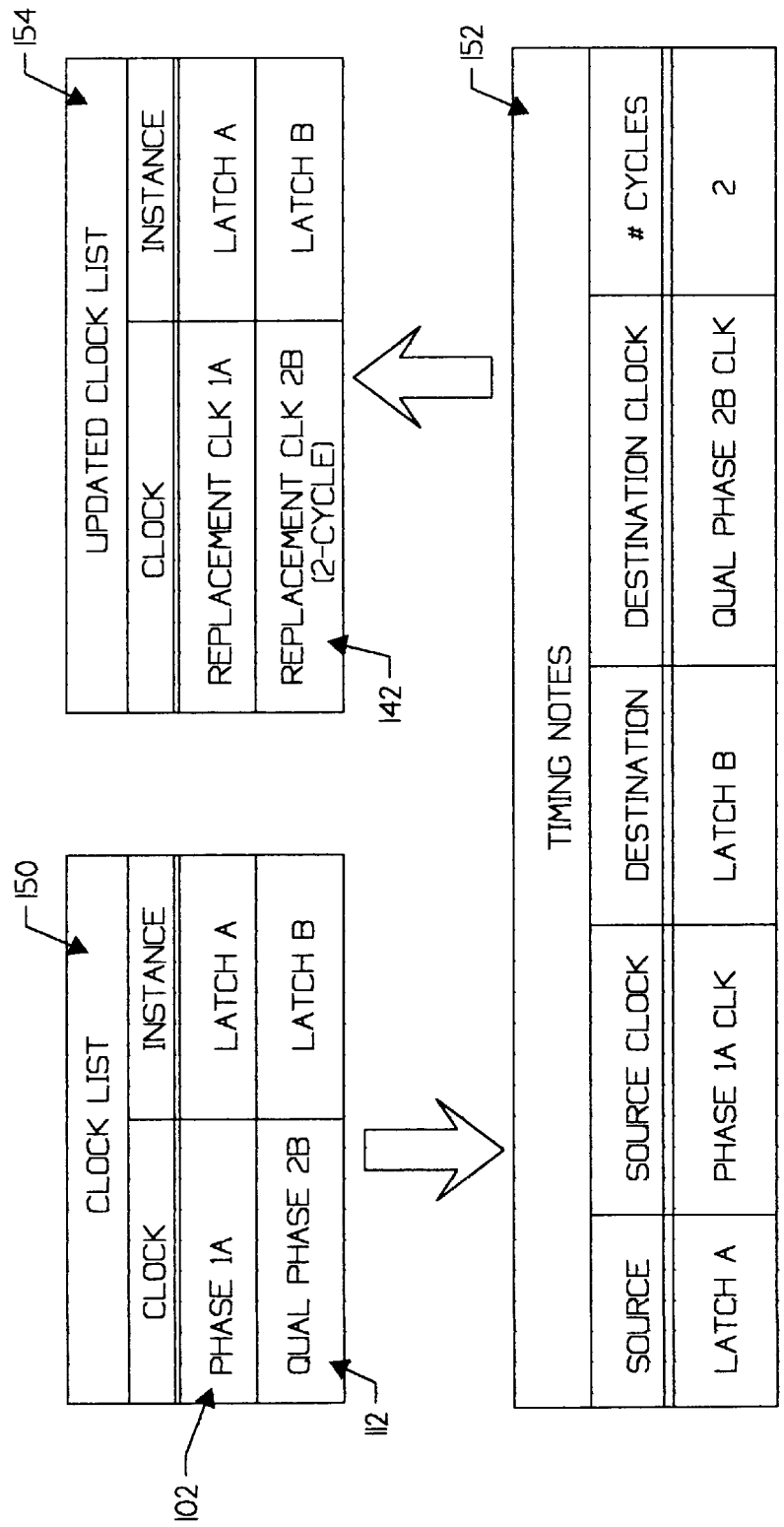
FIG. 5C is a table showing an exemplary method for generating the replacement clocks of FIGS. 5A–5B.

In an exemplary embodiment, a clock list 150 (see FIG. 5C) is generated which identifies one of a number of clocks for each state device within the circuit design. This may be accomplished in any number of ways including using the tracing capability of a standard optimizer tool, as described more fully in,co-pending U.S. patent application Ser. No. 08/752,616, filed Nov. 19, 1996, entitled "Method and Apparatus for Identifying Qualified clocks Within a Circuit Design Using a Standard Optimization Tool".

Once the clock list 150 is generated, timing notes 152 may be provided by a circuit designer. The timing notes 152 identify logic functions that require more time than is allowed by the particular source and destination clock combination. In a preferred embodiment, the timing notes 152 identify a path between a source/destination state device combination, and indicate the number of corresponding clock cycles that are allowed for the path (see FIG. 5C). By using the information, the clock list 150 (see FIG. 5C) may be updated by removing the qualified clock signal 112, and adding a replacement clock 142. In an illustrative embodiment, the replacement clock 142 has the same pulse definition as the clock it replaces, but defines the relationship between the source and destination clock as being equal to the time needed for the corresponding multi-cycle path. The updated clock list 154 (see FIG. 5C) may then be provided to a standard optimizer tool wherein the circuit design may be properly optimized. With reference to FIG. 5B, it is evident that the replacement clock may be properly recognized by a standard optimizer tool, and the circuit design may thus be properly optimized.

Figure 6:
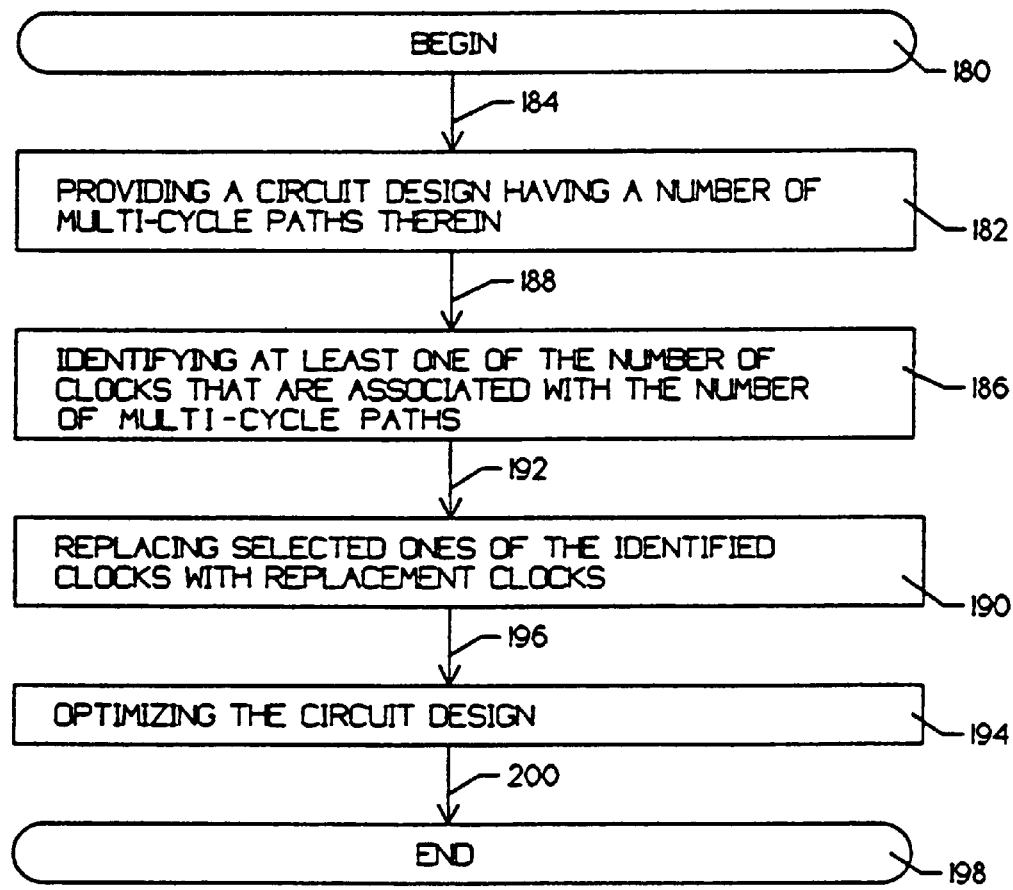
FIG. 6 is a flow diagram showing a first exemplary method in accordance with the present invention.

FIG. 6 is a flow diagram showing a first exemplary method in accordance with the present invention. The algorithm is entered at element 180, wherein control is passed to element 182 via interface 184. Element 182 provides a circuit design having a number of multi-cycle paths therein. Control is then passed to element 186 via interface 188. Element 186 identifies at least one of the number of multi-cycle paths within the circuit design, and the corresponding clocks therefor. Control is then passed to element 190 via interface 192. Element 190 replaces selected ones of the corresponding clocks with replacement clock. Control is then passed to element 194 via interface 196. Element 194 optimizes the circuit design using the replacement clock. Control is then passed to element 198 via interface 200, wherein the algorithm is exited.

Figure 7:
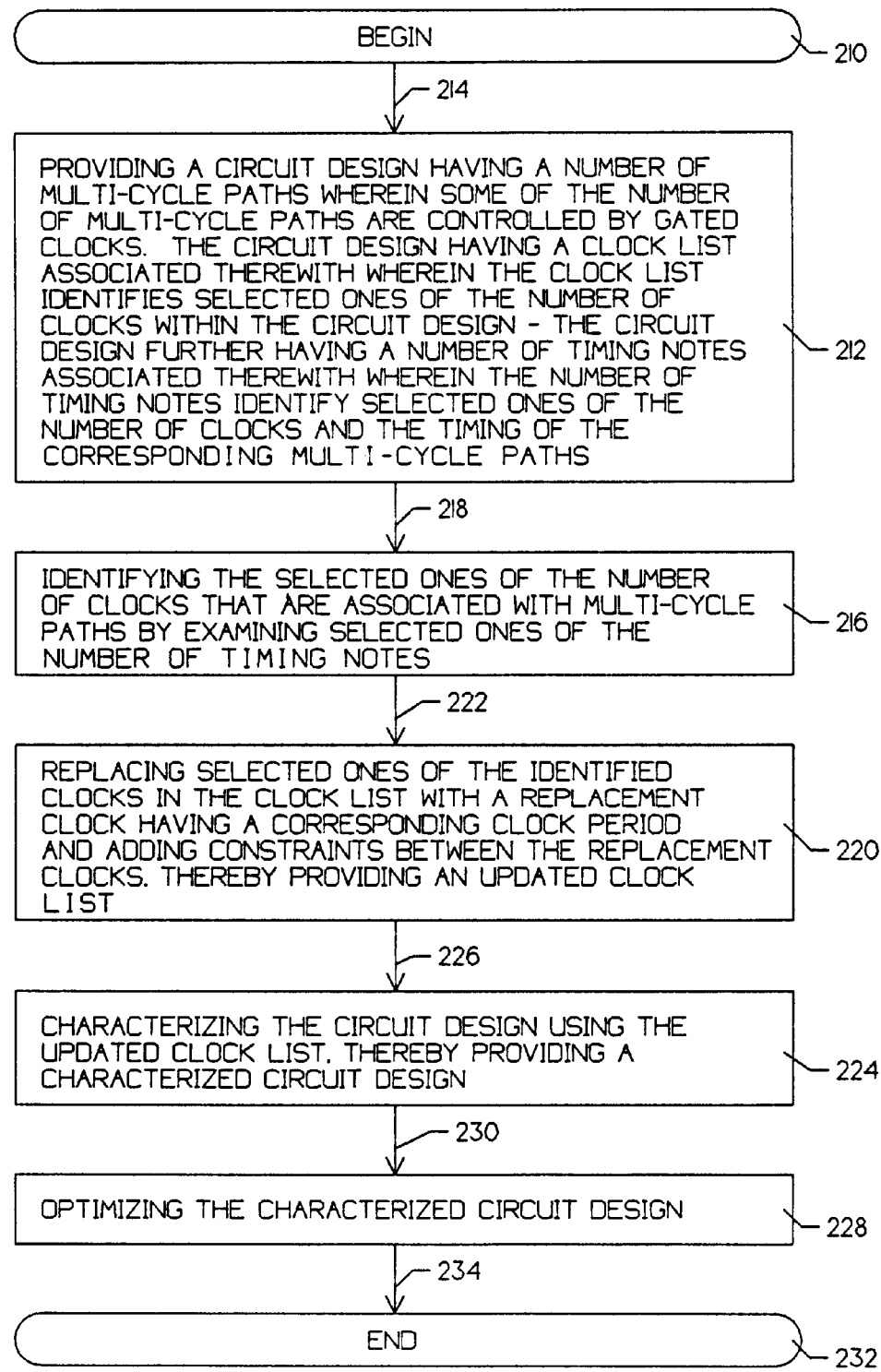
FIG. 7 is a flow diagram showing a second exemplary method in accordance with the present invention.

FIG. 7 is a flow diagram showing a second exemplary method in accordance with the present invention. The algorithm is entered at element 210, wherein control is passed to element 212 via interface 214. Element 212 provides a circuit design having a number of clocks, wherein some of the number of clocks control multi-cycle paths. The circuit design further has a clock list associated therewith, wherein the clock list identifies selected ones of the number of clocks within the circuit design. The circuit design further has a number of timing notes associated therewith, wherein the number of timing notes identify selected ones of the number of clocks, and the timing of the corresponding multi-cycle paths. Control is then passed to element 216 via interface 218. Element 216 identifies the selected ones of the number of clocks that control multi-cycle paths by examining the timing notes. Control is then passed to element 220 via interface 222. Element 220 replaces each of selected ones of the identified clocks with a replacement clock, and provides an updated clock list. Element 220 further adds a number of timing constraints to the updated clock list, wherein the timing constraints define timing relationships between the replacement clocks, and in particular those replacement clocks that are associated with a common multi-cycle path. Control is then passed to element 224 via interface 226. Element 224 characterizes the circuit design using the updated clock list, thereby providing a characterized circuit design. Control is then passed to element 228 via interface 230. Element 228 optimizes the characterized circuit design. Control is then passed to element 232 via interface 234, wherein the algorithm is exited.

Figure 8:
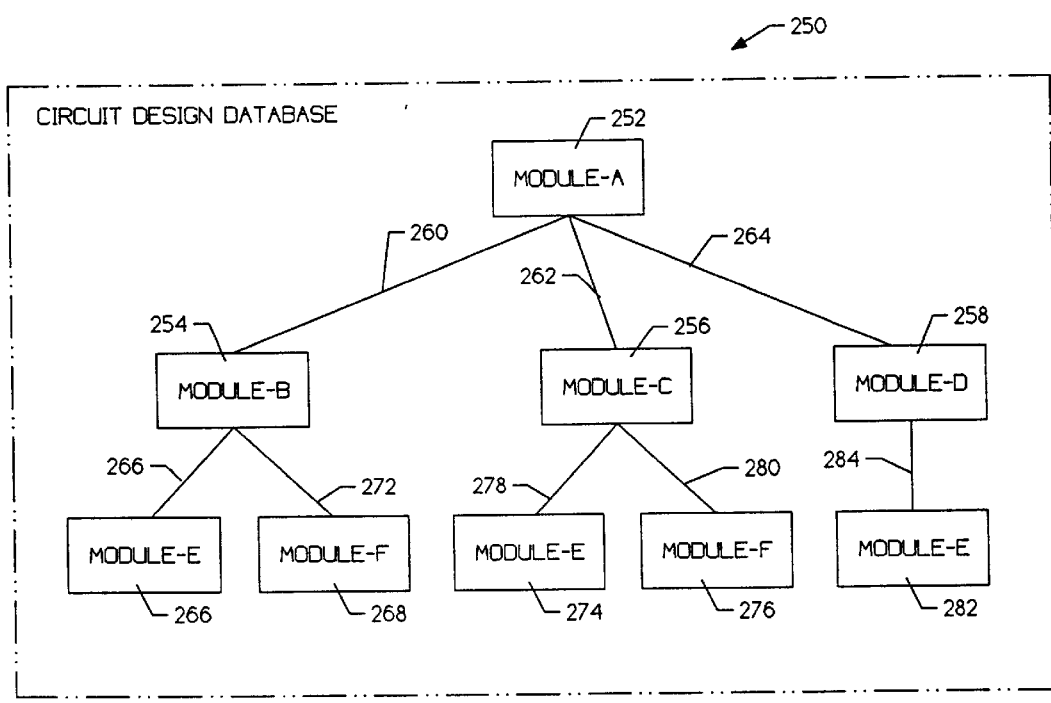
FIG. 8 is a block diagram showing a typical circuit design hierarchy, including a number of hierarchical circuit modules.

FIG. 8 is a block diagram showing a typical circuit design hierarchy, including a number of hierarchical circuit modules. The diagram is generally shown at 250. A top level module-A 252 is provided, and may represent the top hierarchial level in the exemplary circuit design database. Module-A 252 may include references to module-B 254, module-C 256, and module-D 258 as shown at 260, 262 and 264, respectively. Module-B 254, module-C 256, and module-D 258 represent the next lower level of design hierarchy in the circuit design database.

Module-B 254 may include references to module-E 266 and module-F 268 as shown at 270 and 272, respectively. Similarly, module-C 256, may include references to module-E 274 and module-F 276, as shown at 278 and 280, respectively. Finally, module-D 258 may include a reference to module-E 282, as shown at 284. Modules 266, 268, 274, 276 and 282 represent the lowest level in the design hierarchy of the circuit design database, and may be "leaf cells". That is, modules 266, 268, 274, 276 and 282 may be components from a vendor provided cell library.

It is noted that the same module, for example module-E, may be referenced by module-B 254, module-C 256, and module-D 258. To distinguish module-E 266, module-E 274 and module-E 282 from one another, a unique instance name may be provided, thereby allowing each module to be uniquely identified. Similarly, module-F 268 and module-F 276 may be provided with a unique instance name.

It is recognized that in practice, the circuit design database is typically much more complex, containing many more levels of design hierarchy and thousands of modules. That is, the circuit design database shown in FIG. 8 is only presented to illustrate the basic structure of a typical design database.

Because of the size of many of today's circuit designs, the characterization step (see FIG. 3) and the optimization step of a typical logic optimizer tool are only executed on a single module or set of modules at any give time. That is, the circuit designer typically selects a particular module within the overall circuit design, and performs a characterization run and an optimization run thereon.

During the characterization step, the logic optimizer tool may identify all modules that interface with the selected module, and identify the timing paths therebetween. When a path is identified which may violate the timing requirements of the design, the characterization step may assign timing constraints to the selected module. For example, if a path extends from a source state device in a remote module to a destination state device in the selected local module, and the propagation time of that path is longer than a predetermined timing specification, the characterization step may allocate a portion of the overrun to the remote module and a portion of the overrun to the selected local module.

During optimization of the selected local module, the optimizer tool may attempt to optimize the logic in the selected local module such that the overrun allocated thereto may be overcome. Likewise, during optimization of the remote module, the optimizer tool may attempt to optimize the logic in the remote module such that the overrun allocated thereto may be overcome.

Because the characterization step and the optimization step are typically executed on the modules within a design in a serial fashion, some of the information required for the proper optimization of gated or qualified clocked designs may not be properly transferred from one module to another. For example, during characterization of a selected local module, a typical logic optimizer tool may only store the clock phase of the source state device and the delay to the selected local module for each path between the remote module and the selected local module. This may be inadequate for the proper optimization of the selected local module, particularly when the selected local module includes a multi-cycle path (see FIG. 9A–9C).

Figure 9A:
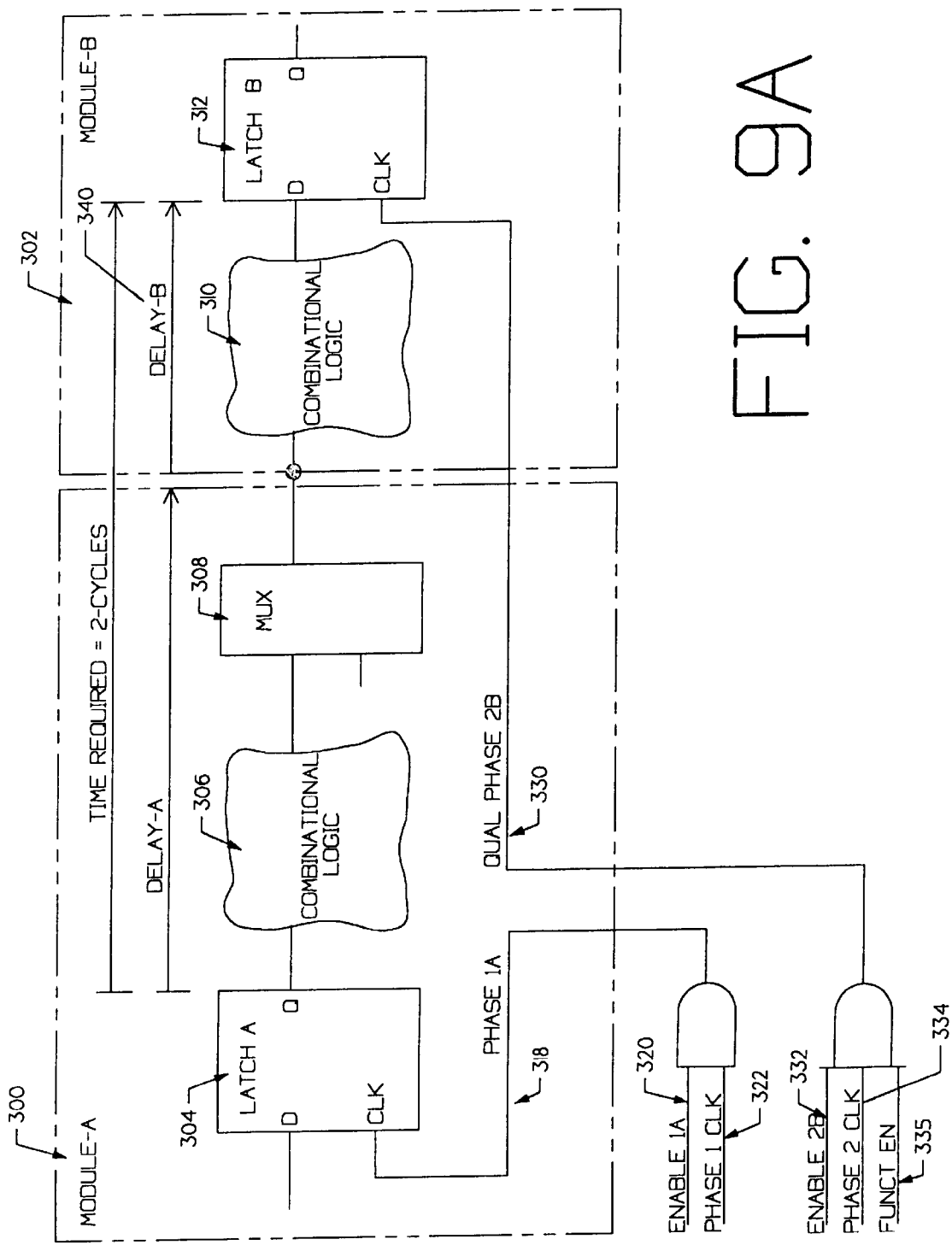
FIG. 9A is a block diagram showing a path from a first module to a second module.

FIG. 9A is a block diagram showing a path from a first module to a second module. A remote module-A 300 and a local module-B 302 are shown. As indicated above, the characterization tool typically only operates on one module at a time. In the illustrative embodiment shown in FIG. 9A, the characterization tool is operating on local module-B 302.

Remote module-A 300 may include a source latch 304 that provides data through combinational logic 306 and multiplexer 308. The data is then provided to local module-B 302, and is provided through combinational logic 310 and finally to destination latch 312. The delay from source latch 304 to the boundary of module-A 300 is shown as delay-A 338. The delay from the boundary of module-B 302 to the destination latch 312 is shown as delay-B 340. The predetermined specification for the propagation delay from the source latch 304 to the destination latch 312 is set to allow two cycles of a phase 2B clock signal, as shown at 336.

In the illustrative embodiment, the source latch 304 may be controlled by a gated clock phase 1A 318, which is generated by anding raw clock signal phase 1 clk 322 and the enable signal enable 1A 320. The destination latch 312 may be controlled by a qualified clock signal qual phase 2B 330, which may be generated by anding raw clock signal phase 2 clock 334, enable signal enable 2B 332, and functional enable signal 335.

A limitation of some prior art optimization tools is that the characterization step does not store the necessary information from the remote modules to properly optimize the selected local module. For example, and with reference to FIG. 9B, typical prior art logic optimizer tools may only store the phase of the clock of the source latch and the delay from the source latch to the boundary of the remote module. However, no information may be stored that indicates the number of cycles of the clock that are allowed to propagate the data from the particular source latch to the destination latch. Further, there may be any number of paths extending from a number of source devices in the remote module to the destination latch in the local module. Each of these paths may be allowed a different number of clock cycles of the raw clock signal to propagate from the corresponding source latch to the destination latch.

FIG. 9C is a table showing exemplary timing constraints stored for Module-B of FIG. 9A, in accordance with the present invention. To eliminate the above limitation, the present invention contemplates storing for each path that extends from a remote module to the local module, the phase of the corresponding source clock, the propagation delay from the corresponding source latch to the boundary of the local module, and the number of raw clock cycles that are allowed for the data to propagate from the corresponding source latch to the destination latch. This information may allow the optimization tool to properly optimize the local module.

For example, the optimizer tool can calculate the overall delay from each source latch (located in a remote module) to the destination latch by simply adding the delay from the source latch to the boundary of the local module to the delay from the boundary of the local module to the destination latch. Further, the optimizer tool may determine the allowed propagation time from each source latch to each destination latch by analyzing the number of raw clock cycles that are allowed for that path. Accordingly, the optimizer tool may optimize the circuity in the local module, for example combinational logic 310, such that each of the paths meet the desired requirements. Similarly, remote module-A 300 may be optimized such that each of the paths meet the desired requirements.

To coordinate how much each module must be optimized, it is contemplated that the characterization step may allocate the propagation time overrun for each path between both the local module-B 302 and the remote module-A 300. In a preferred embodiment, the overrun is simply evenly divided between these modules.

In another exemplary embodiment, and with reference to FIG. 9C, a number of other parameters may be stored for each path in the circuit design. These parameters include the source latch, the corresponding destination latch, the source clock phase, the destination clock phase, the delay from the source latch to the boundary of the local module, and the number of raw clock cycles that are allowed for the data to propagate through the path. This information may be stored for each path in the circuit design, including those paths that cross module boundaries.

It is contemplated that the above timing constraints may be associated with a corresponding path, a corresponding part of the local or remote module, the source state device or the destination state device, and may be stored in any way including as an attribute thereof.

Figure 10:
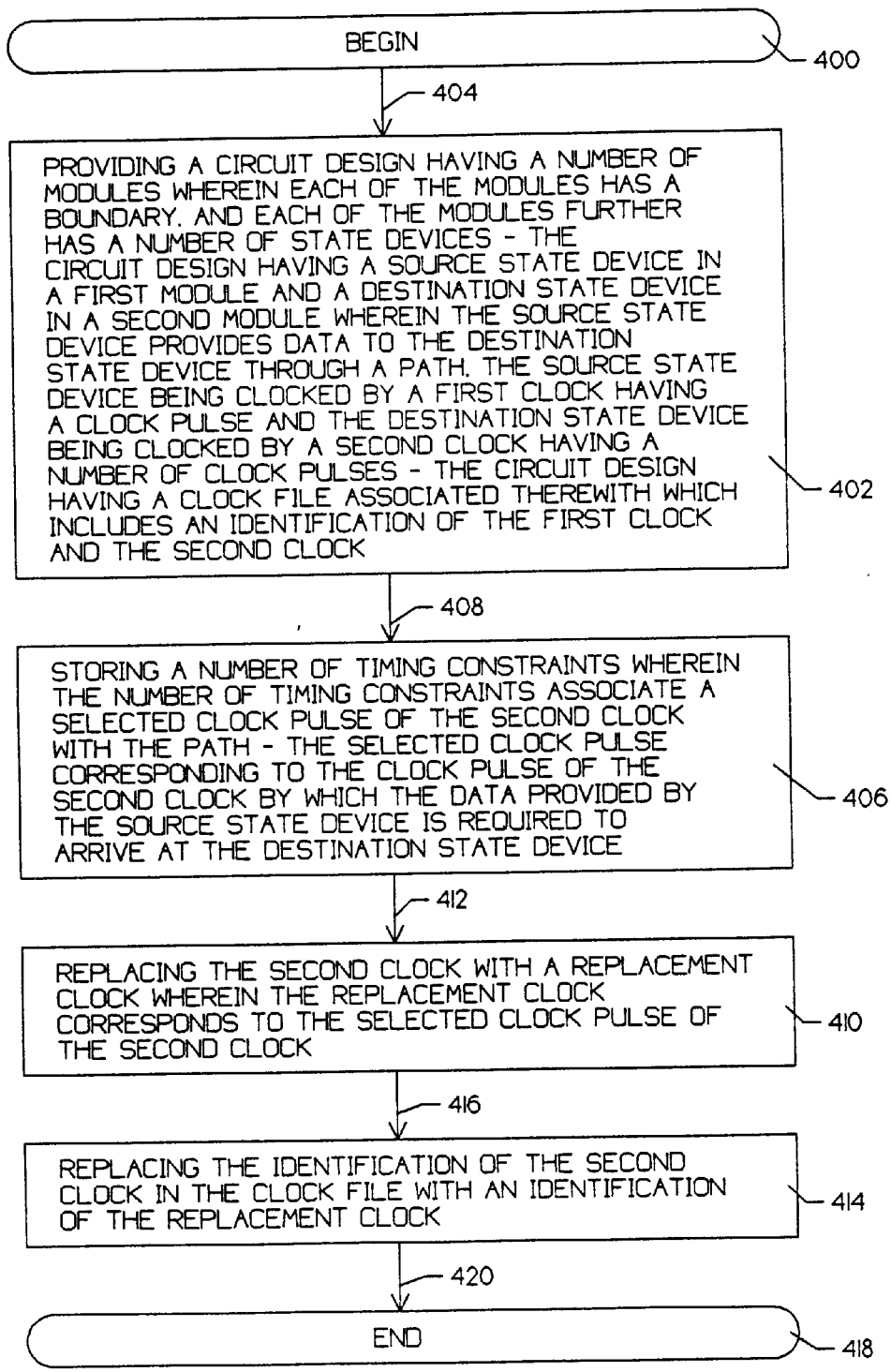
FIG. 10 is a flow diagram showing a third exemplary method in accordance with the present invention.

FIG. 10 is a flow diagram showing a third exemplary method in accordance with the present invention. The algorithm is entered at element 400, wherein control is passed to element 402 via interface 404. Element 402 provides a circuit design that has a number of modules, wherein each of the modules has a boundary and each of the modules further has a number of state devices. The circuit design has a source state device in a first module and a destination state device in a second module, wherein the source state device provides data to the destination state device through a path. The source state device is clocked by a first clock having a clock pulse, and the destination state device is clocked,by a second clock having a number of clock pulses. Finally, the circuit design has a clock file associated therewith which includes an identification of the first clock and the second clock. Control is then passed to element 406 via interface 408.

Element 406 stores a number of timing constraints, wherein the number of timing constraints associate a selected clock pulse of the second clock with the path. The selected clock pulse corresponds to the clock pulse of the second clock by which the data provided by the source state device is required to arrive at the destination state device. Control is then passed to element 410 via interface 412. Element 410 replaces the second clock with a replacement clock, wherein the replacement clock corresponds to the selected clock pulse of the second clock. It is contemplated that element 410 may replace both the first clock and the second clock with replacement clocks, and may record timing constraints therebetween. Control is then passed to element 414 via interface 416. Element 414 replaces the identification of the second clock in the clock file with an identification of the replacement clock. Control is then passed to element 418 via interface 420, wherein the algorithm is exited.

Figure 11A:
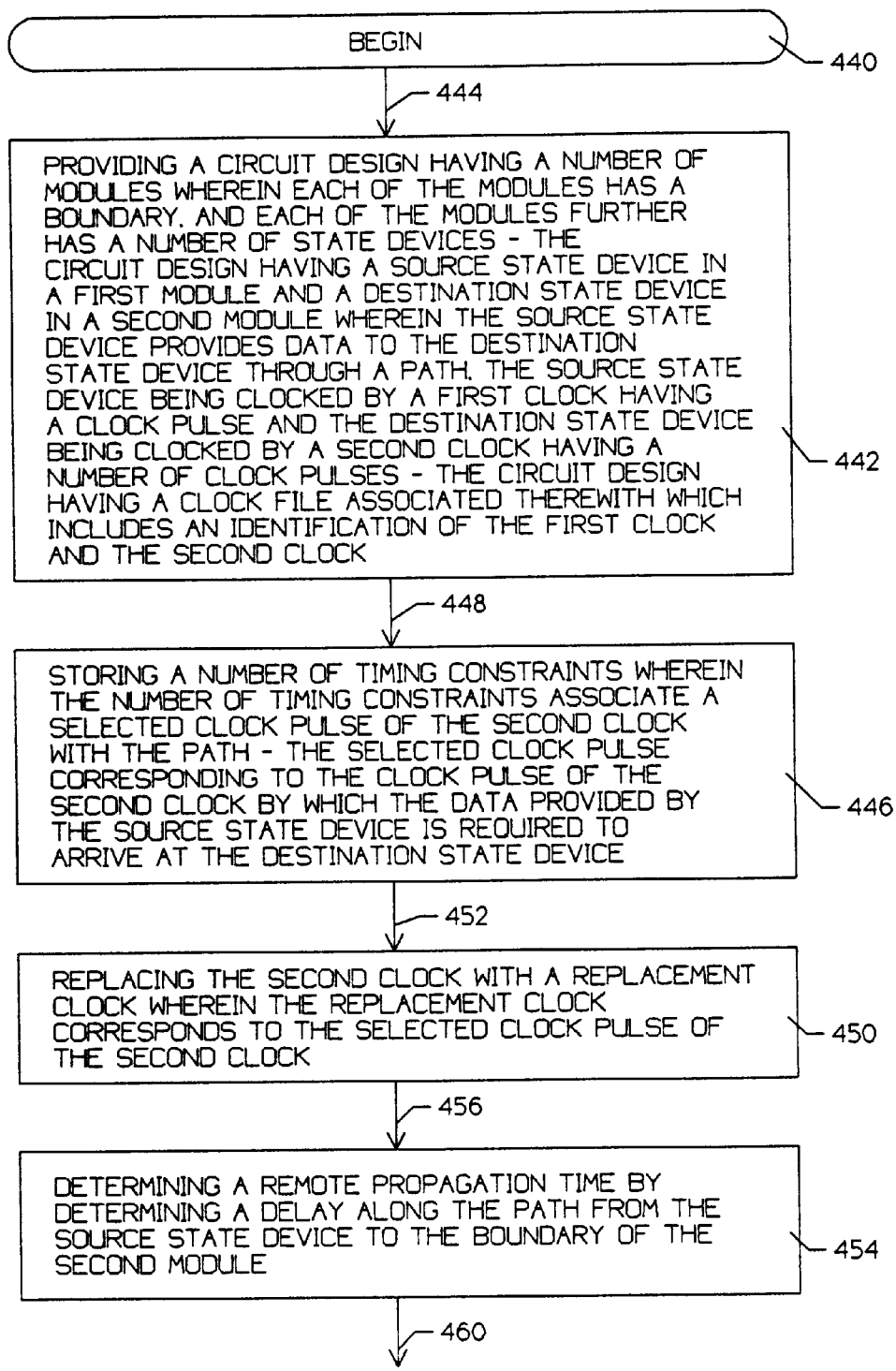
FIGS. 11A and 11B are a flow diagram showing a fourth exemplary method in accordance with the present invention.
Figure 11B:
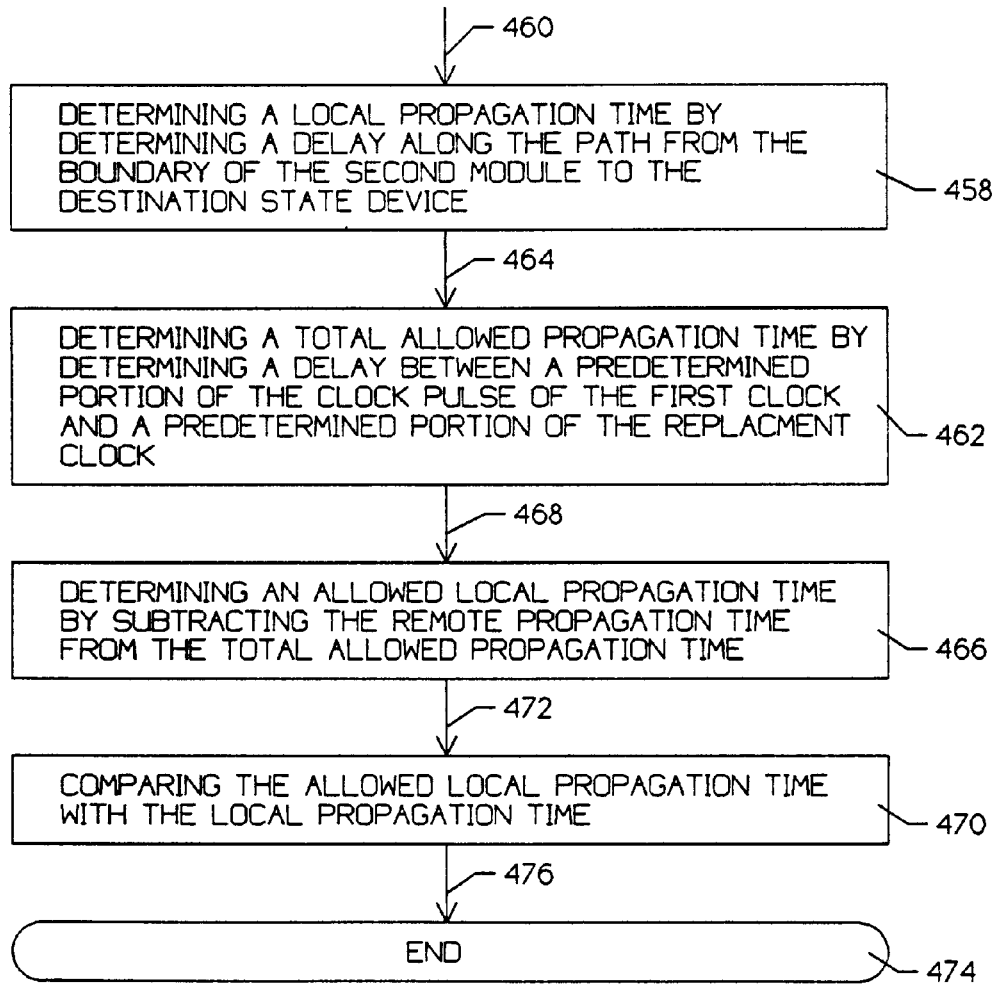

FIGS. 11A and 11B are a flow diagram showing a fourth exemplary method in accordance with the present invention. The algorithm is entered at element 440, wherein control is passed to element 442 via interface 444.

Element 442 provides a circuit design that has a number of modules, wherein each of the modules has a boundary and each of the modules further has a number of state devices. The circuit design has a source state device in a first module and a destination state device in a second module, wherein the source state device provides data to the destination state device through a path. The source state device is clocked by a first clock having a clock pulse, and the destination state device is clocked by a second clock having a number of clock pulses. Finally, the circuit design has a clock file associated therewith which includes an identification of the first clock and the second clock. Control is then passed to element 446 via interface 448. Element 446 stores a number of timing constraints, wherein the number of timing con-straints associate a selected clock pulse of the second clock with the path. The selected clock pulse corresponds to the clock pulse of the second clock by which the data provided by source state device is required to arrive at the destination state device. Control is then passed to element 450 via interface 452.

Element 450 replaces the second clock with a replacement clock, wherein the replacement clock corresponds to the selected clock pulse of the second clock. It is contemplated that element 410 may replace both the first clock and the second clock with replacement clocks, and may record timing constraints therebetween. Control is then passed to element 454 via interface 456. Element 454 determines a remote propagation time by determining a delay along the path from the source state device to the boundary of the second module. Control is then passed to element 458 via interface 460. Element 458 determines a local propagation time by determining a delay along the path from the boundary of the second module to the destination state device. Control is then passed to element 462 via interface 464. Element 462 determines a total allowed propagation time by determining a delay between a predetermined portion of the clock pulse of the first clock and a predetermined portion of the replacement clock. Control is then passed to element 466 via interface 468. Element 466 determines an allowed local propagation time by subtracting the remote propagation time from the total allowed propagation time. Control is then passed to element 470 via interface 472. Element 470 compares the allowed local propagation time with the local propagation time. Control is then passed to element 474 via interface 476, wherein the algorithm is exited.

FIGS. 12A–12D are a flow diagram showing a fifth exemplary method in accordance with the present invention, and exemplary variations thereof. The algorithm is entered at element 500, wherein control is passed to element 502 via interface 504. Element 502 provides a circuit design that has a number of modules, wherein each of the modules has a boundary, and each of the modules further has a number of state devices. The circuit design has a source state device in a first module, and a designation state device in a second module, wherein the source state device provides data to the destination state device through a path. The source state device is clocked by a first clock having a clock pulse, and the destination state device is clocked by a second clock having a number of clock pulses. It is recognized that the first clock and the second clock may correspond to the same clock signal. Control is then passed to element 506 via interface 508. Element 506 stores a number of timing constraints, wherein the number of timing constraints associate a selected clock pulse of the second clock with the path. The selected clock pulse corresponds to the clock pulse of the second clock by which the data provided by the source state device is required to arrive at the destination state device. Control is then passed to element 510 via interface 512. Element 510 determines a remote propagation time by determining a delay along the path from the source state device to the boundary of the second module. Control is then passed to element 514 via interface 516. Element 514 determines a local propagation time by determining a delay along the path from the boundary of the second module to the destination state device. Control is then passed to element 518 via interface 520. Element 518 determines a total allowed propagation time by determining a delay between a predetermined portion of the clock pulse of the first clock and a predetermined portion of the selected clock pulse of the second clock. Control is then passed to element 522 via interface 524. Element 522 determines an allowed local propagation time by subtracting the remote propagation time from the total allowed propagation time. Control is then passed to element 526 via interface 528. Element 526 compares the allowed local propagation time with the local propagation time. Control is then passed to element 530 via interface 532. Element 530 optimizes the portion of the path that lies in the first and/or second module if the local propagation time exceeds the allowed local propagation time by a predetermined amount. Control is then passed to element 534 via interface 536, wherein the algorithm is exited.

Figure 12A:
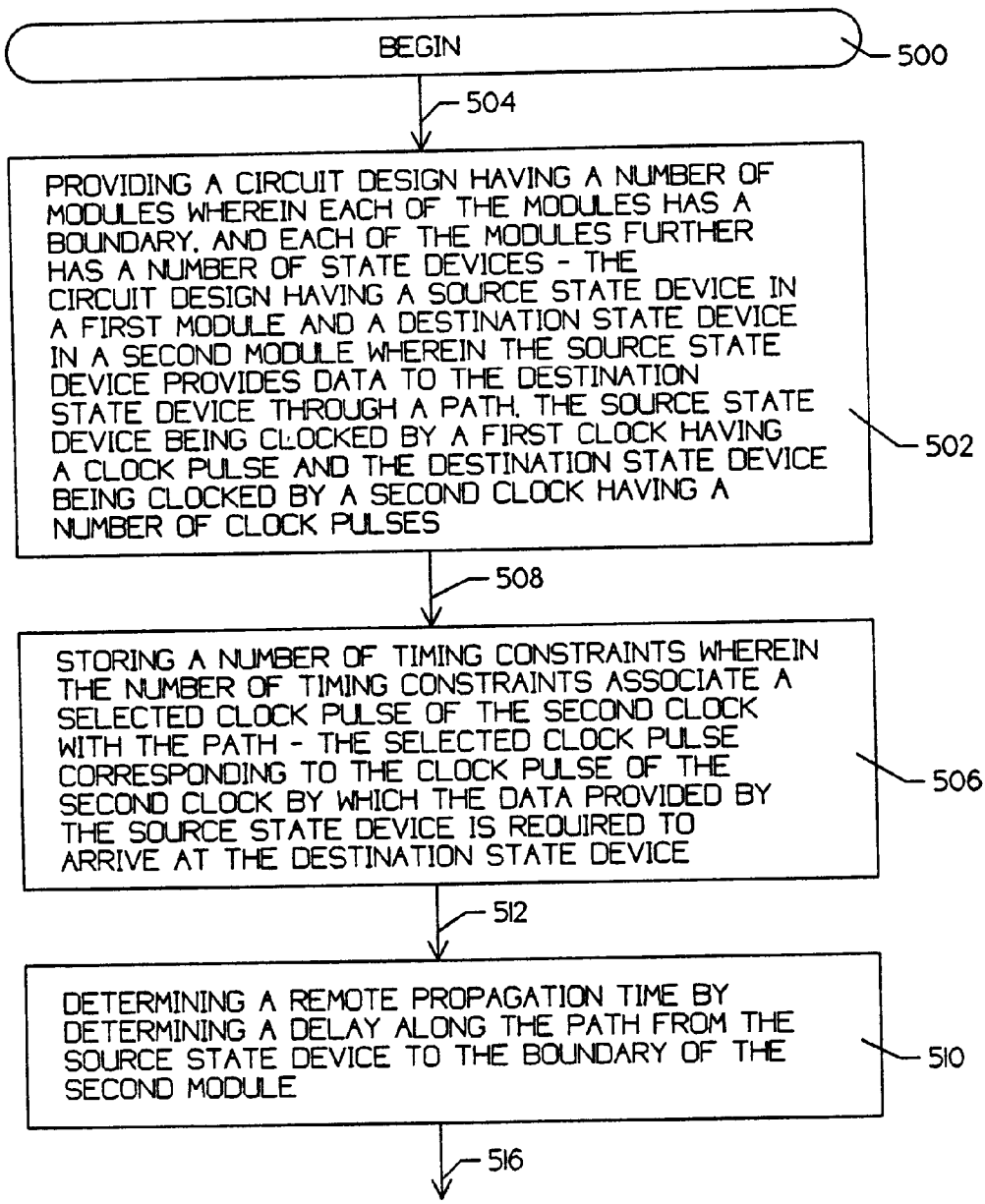
FIGS. 12A–12D are a flow diagram showing a fifth exemplary method in accordance with the present invention, and exemplary variations thereof.
Figure 12B:
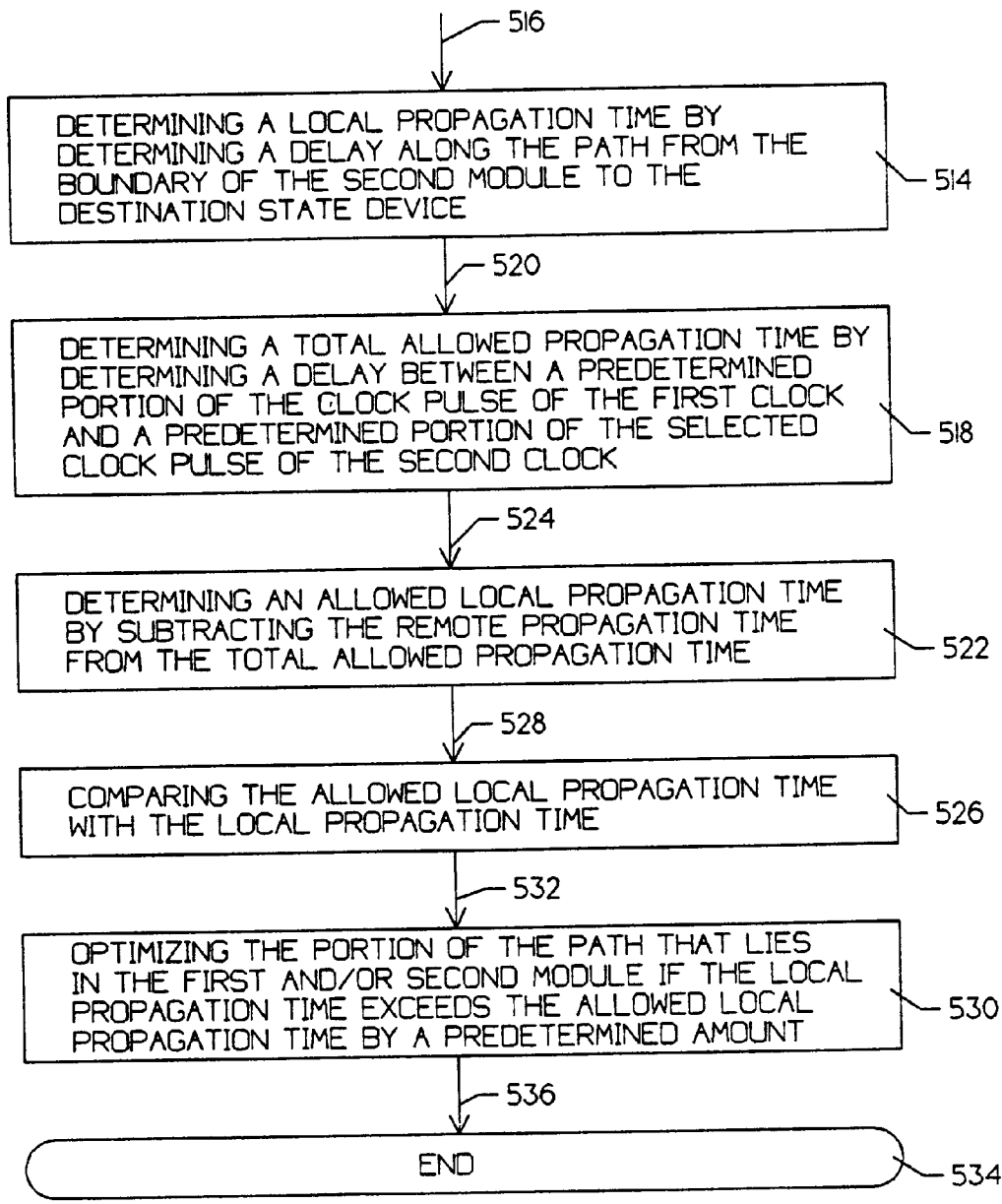
Figure 12C:
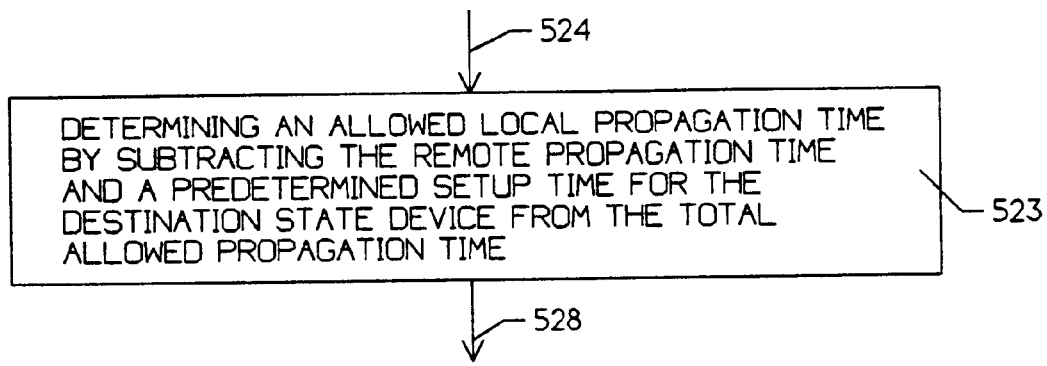

Referring to FIG. 12C it is recognized that the determining element 522 of FIG. 12B may be replaced by element 523 of FIG. 12C. Element 523 determines an allowed local propagation time by subtracting the remote propagation time and a predetermined setup time for the destination state device from the total allowed propagation time. This may allow the optimizer tool to recognize setup times and optimize the circuit design in accordance therewith.

Figure 12D:
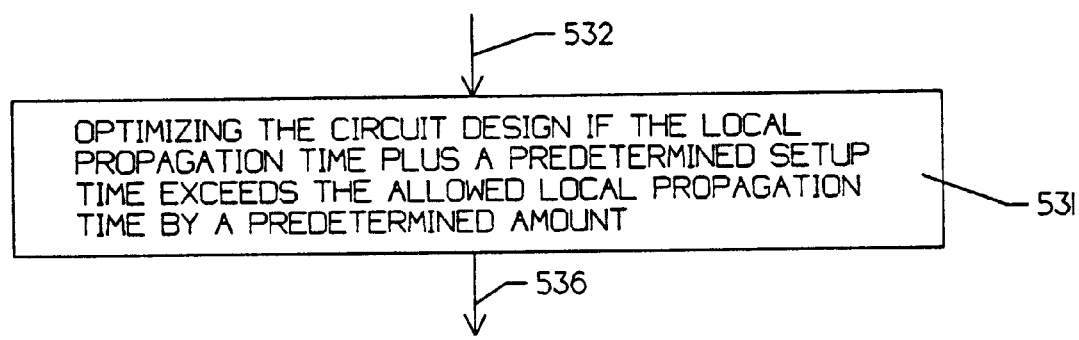

Referring to FIG. 12D, it is recognized that element 530 of FIG. 12B may be replaced by element 531 of FIG. 12D. Element 531 may optimize the circuit design only if the local propagation time plus a predetermined setup time exceeds the allowed local propagation time by a predetermined amount. This to may allow the optimizer tool to recognize setup times and optimize the circuit design in accordance therewith.

Figure 13A:
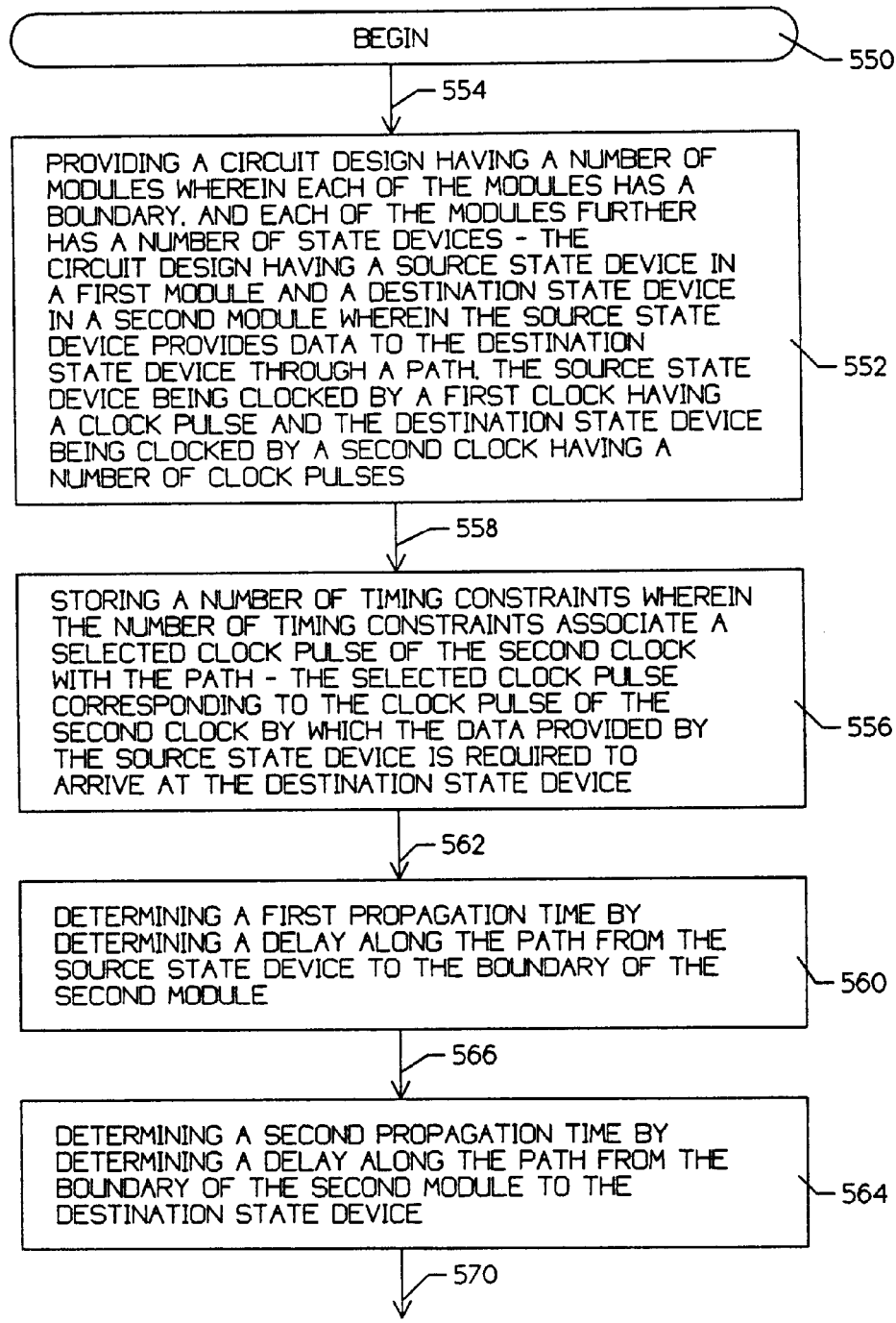
FIGS. 13A and 13B are a flow diagram showing a sixth exemplary method in accordance with the present invention.
Figure 13B:
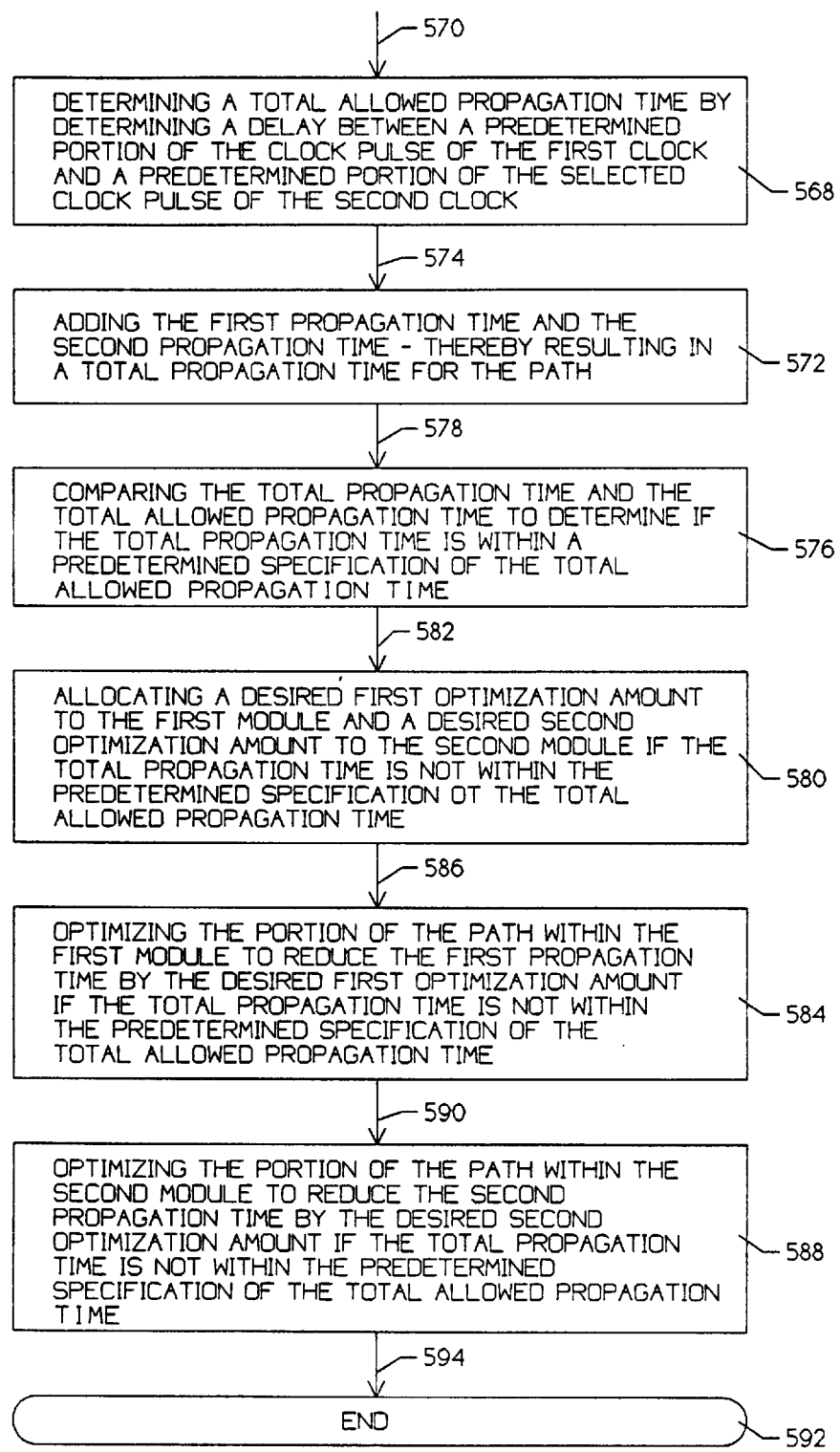

FIGS. 13A and 13B are a flow diagram showing a sixth exemplary method in accordance with the present invention. The algorithm is entered at element 550, wherein control is passed to element 552 via interface 554. Element 552 provides a circuit design that has a number of modules, wherein each of the modules has a boundary, and each of the modules further has a number of state devices. The circuit design may include a source state device in a first module and a destination state device in a second module, wherein the source state device provides data to the destination state device through a path. The source state device is clocked by a first clock having a clock pulse, and the destination state device is clocked by a second clock having a number of clock pulses. It is recognized in all of these embodiments that the first clock and the second clock may correspond to the same clock signal. Control is then passed to element 556 via interface 558. Element 556 stores a number of timing constraints, wherein the number of timing constraints associate a selected clock pulse of the second clock with the path. The selected clock pulse corresponds to the clock pulse of the second clock by which the data provided by the source state device is required to arrive at the destination state device. Control is then passed to element 560 via interface 562. Element 560 determines a first propagation time by determining a delay along the path from the source state device to the boundary of the second module. Control is then passed to element 564 via interface 566. Element 564 determines a second propagation time by determining a delay along the path from the boundary of the second module to the destination state device. Control is then passed to element 568 via interface 570. Element 568 determines a total allowed propagation time by determining a delay between a predetermined portion of the clock pulse of the first clock and a predetermined portion of the selected clock pulse of the second clock. Control is then passed to element 572 via interface 574. Element 572 adds the first propagation time and the second propagation time, thereby resulting in a total propagation time for the path. Control is then passed to element 576 via interface 578. Element 576 compares the total propagation time and the total allowed propagation time to determine if the total propagation time is within a predetermined specification of the total allowed propagation time. Control is then passed to element 580 via element 582. Element 580 allocates a desired first optimization amount to the first module and a desired second optimization amount to the second module if the total propagation time is not within the predetermined specification of the total allowed propagation time. Control is then passed to element 584 via interface 586. Element 584 optimizes the portion of the path within the first module to reduce the first propagation time by the desired first optimization amount if the total propagation time is not within the predetermined specification of the total allowed propagation time. Control is then passed to element 588 via interface 590. Element 588 optimizes the portion of the path within the second module to reduce the second propagation time by the desired second optimization amount if the total propagation time is not within the predetermined specification of the total allowed propagation time. Control is then passed to element 592 via interface 594, wherein the algorithm is exited.

Figure 14:
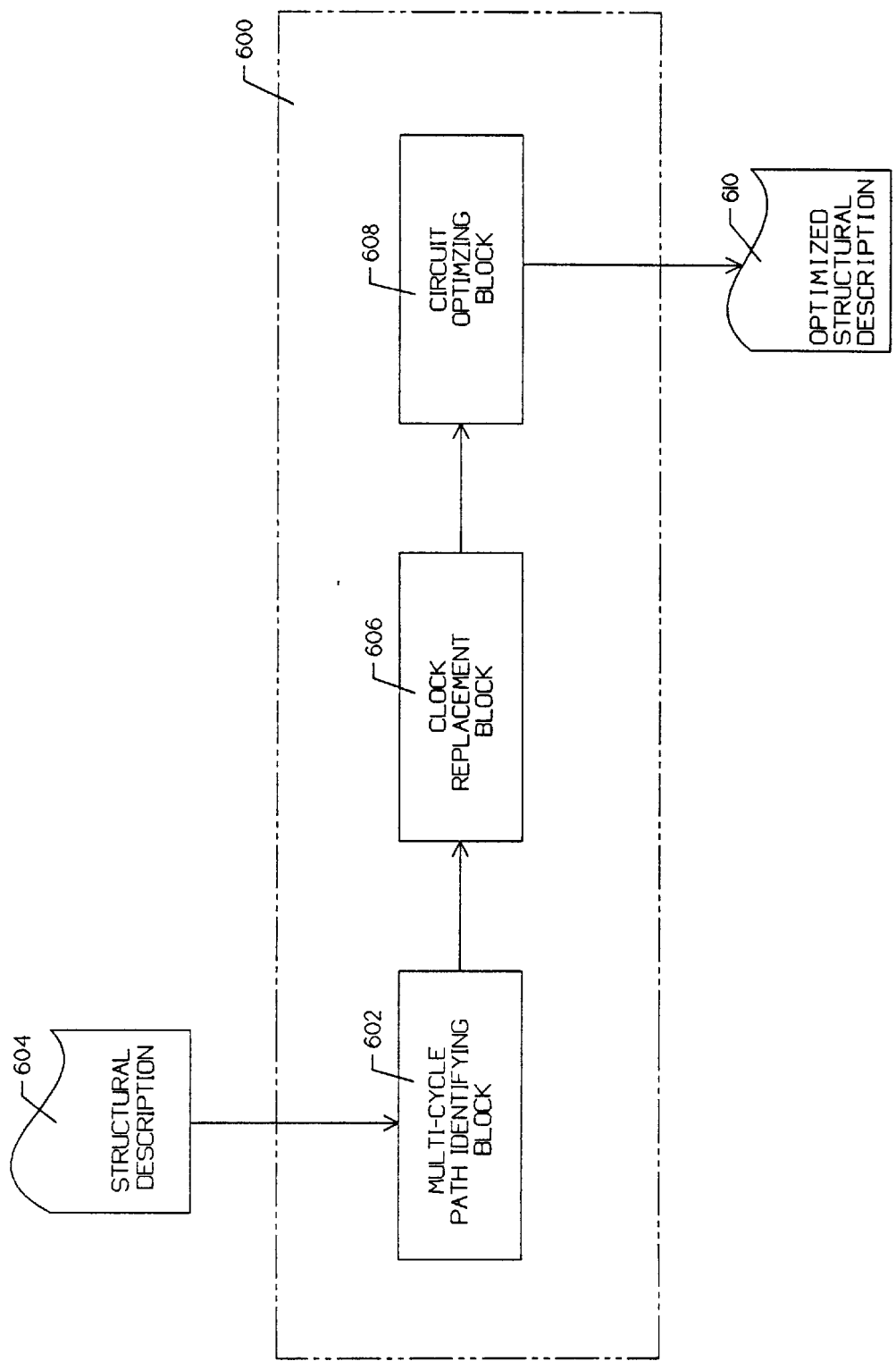
FIG. 14 is a block diagram of a first exemplary data processing system in accordance with the present invention.

FIG. 14 is a block diagram of a first exemplary data processing system in accordance with the present invention. The data processing system is generally shown at 600, and may include a multi-cycle path identifying block 602, a clock replacement block 606, and a circuit optimization block 608. The multi-cycle path identifying block 602 may read a structural description 604, and identify at least one of a number of multi-cycle paths within the circuit design. Clock replacement block 606 may then replace selected clocks that control the identified multi-cycle paths with replacement clocks. Timing constraints may be provided between the replacement clocks to provide the proper timing therebetween. Finally, the circuit optimizing block 608 may optimize the circuit design using the replacement clocks provided by Clock replacement block 606. The circuit optimizing block 608 may then provide an optimized structural description, as shown at 610. It is recognized that the circuit optimizing block 608 may include both an optimizing portion and a characterizing portion. The characterizing portion may characterize the circuit design prior to the optimization of the circuit design.

Figure 15:
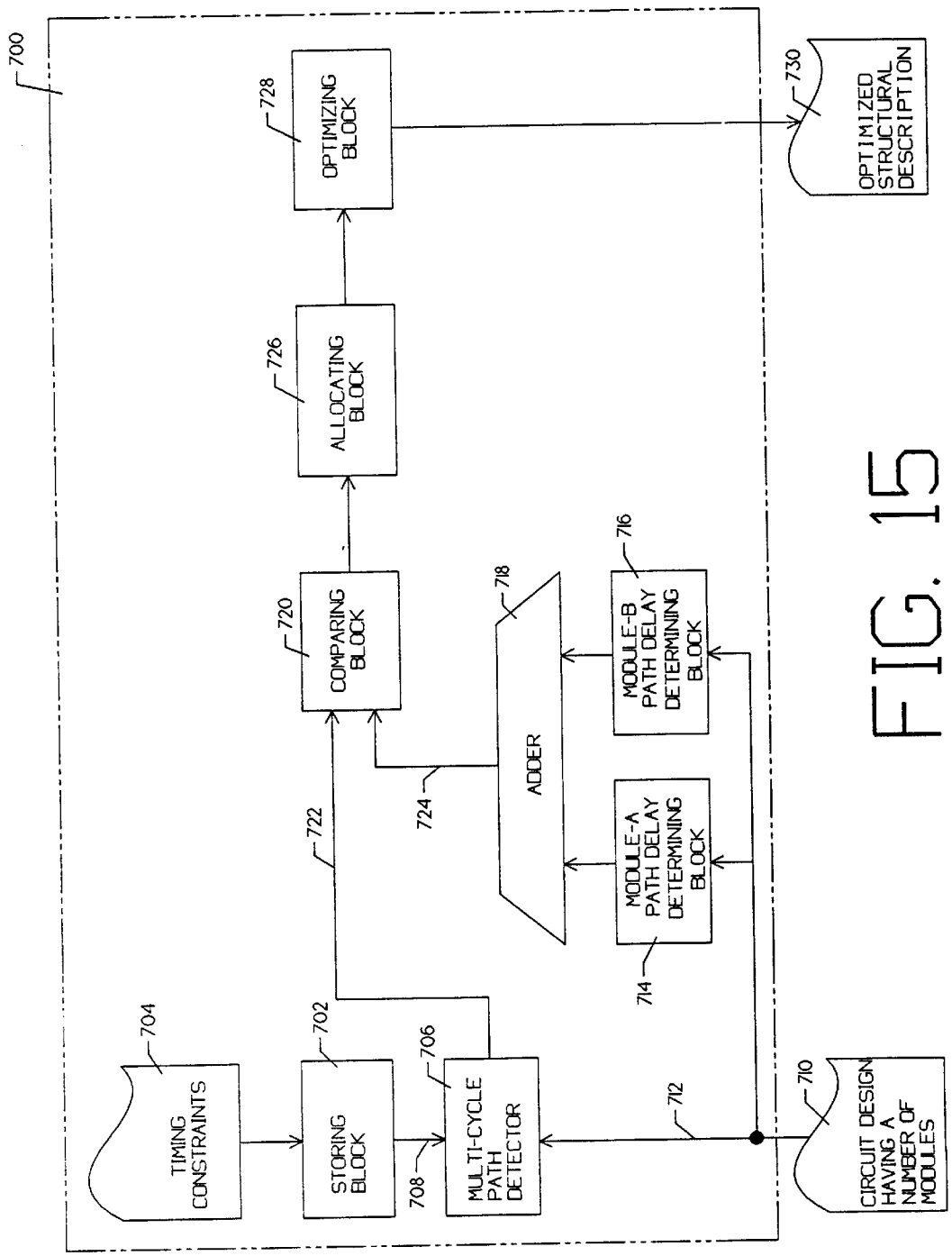
FIG. 15 is a block diagram of a second exemplary data processing system in accordance with the present invention.

FIG. 15 is a block diagram of second exemplary data processing system in accordance with the present invention. The data processing system is generally shown at 700 and may include a storing block 702, a multi-cycle path detector block 706, a module-A path delay determining block 714, a module-B path delay determining block 716, an adder 718, a comparing block 720, an allocating block 726, and an optimizing block 728.

It is contemplated that the apparatus shown at 700 may operate on a circuit design that has a number of modules, wherein each of the modules has a boundary, and wherein each of the modules has a number of state devices therein. The circuit design may further have a source state device in a first module and a destination state device in a second module, wherein the source state device provides data to the destination state device through a path. The source state device is clocked by a first clock having a clock pulse, and a destination state device is clocked by a second clock having a number of clock pulses.

In the exemplary embodiment, the storing block 702 stores a number of timing constraints, wherein the number of timing constraints associate a selected clock pulse of the second clock with the path. The selected clock pulse corresponds to the clock pulse of the second clock by which the data provided by the source state device is required to arrive at the destination state device. The timing constraints are provided to multi-cycle path detector 706 via interface 708. Further, the circuit design data base 710 is provided to multi-cycle path detector 706 via interface 712. The multi-cycle path detector 706 may determine a total allowed propagation time by determining a delay between a predetermined portion of the clock pulse of the first clock and a predetermined portion of the selected clock pulse of the second clock. It is contemplated that the multi-cycle path detector 706 may determine a total allowed propagation time for each multi-cycle path in the circuit design. Further, it is contemplated that the multi-cycle path detector may be removed, and a total allowed propagation time for each multi-cycle path may be stored in storing block 702.

The circuit design 710 is also be provided to module-A path delay determining block 714 and module-B path delay determining block 716. Module-A path delay determining block 714 may determine a first propagation time by determining a delay along the path from the source state device to the boundary of the second module. Similarly, module-B path delay determining block 716 may determine a second propagation time by determining a delay along the path from the boundary of the second module to the destination state device. Adder 718 may add the first propagation time to the second propagation time, thereby resulting in a total propagation time for the path. The total propagation time for the path 724 may be compared with the total allowed propagation time using comparing block 720. Comparing block 720 may determine if the total propagation time is within a predetermined specification of the total allowed propagation time.

Allocating block 726 may allocate a desired first optimization amount to the first module, and a desired second optimization amount to the second module if the total propagation time is not within the predetermined specification of the total allowed propagation time. Optimizing block 728 may optimize the portion of the path within the first module to reduce the first propagation time by the desired first optimization amount and may optimize the portion of the path within the second module to reduce the second propagation time by the desired second optimization amount, if the total propagation time is not within the predetermined specification of the total allowed propagation time. Optimizing block 728 may then provide an optimized structural description, as shown at 730.

Having thus described the preferred embodiments of the present invention, those of skill in the art will readily appreciate that the teachings found herein may be applied to yet other embodiments within the scope of the claims hereto attached.

What is claimed is:

1. A method for optimizing a circuit design having a number of multi-cycle paths therein, the method comprising the steps of:

identifying at least one of the number of multi-cycle paths within the circuit design, wherein each of the identified multi-cycle paths is controlled at least in part by a corresponding qualified clock signal, each of the qualified clock signals being generated by one or more gating blocks that logically combine a corresponding raw clock signal having a raw clock period and a phase with at least one other signal so that the corresponding qualified clock signal has a selectively extendable clock period and phase;

replacing selected ones of the qualified clock signals with a corresponding replacement clock signal, wherein each of the replacement clock signals have a clock period and a phase that corresponds to the selectively extendable clock period and phase of the corresponding qualified clock signals; and optimizing the circuit design using selected replacement clock signals.

2. A method according to claim 1 wherein the optimizing step comprises the initial step of characterizing the circuit design.

3. A method according to claim 2 wherein the circuit design has a corresponding clock list, and the clock list includes a listing of selected ones of a number of clock signals available to the circuit design.

4. A method according to claim 3 wherein the circuit design has a number of timing notes associated therewith, wherein selected ones of the number of timing notes indicate the correspondence between the number of clocks signal and the number of multi-cycle paths.

5. A method according to claim 4 wherein said identifying step identifies the multi-cycle paths by examining the number of timing notes.

6. A method according to claim 5 wherein said replacing step replaces selected ones of the identified clock signals, in the clock list, with corresponding replacement clock signals by removing the identified clock signals from the clock list and adding the replacement clock signals to the clock list, thereby resulting in an updated clock list.

7. A method according to claim 6 wherein said characterizing step characterizes the circuit design using the updated clock list.

8. A method according to claim 7 wherein said characterizing step comprises:

performing a timing analysis on the circuit design thereby providing a timing analysis report; and assigning a number of timing constraints to a number of modules within the circuit design by referencing the timing analysis report.

9. A method according to claim 8 wherein said optimizing step sequentially optimizes selected ones of the number of modules within the circuit design using the timing constraints assigned to the corresponding module.

10. A method for optimizing a circuit design having a number of clock signals wherein some of the number of clock signals are associated with a number of multi-cycle paths, the circuit design having a clock list associated therewith wherein the clock list identifies selected ones of the number of clock signals within the circuit design, the circuit design further having a number of timing notes associated therewith wherein the number of timing notes identify the required clock period of selected ones of the number of multi-cycle paths, the method comprising the steps of:

identifying the selected ones of the number of multi-cycle paths, and the associated clock signals, by examining selected ones of the number of timing notes;

replacing selected ones of the associated clock signals of the identified multi-cycle paths, in the clock list, with replacement clock signals having a corresponding clock period, thereby providing an updated clock list;

characterizing the circuit design using the updated clock list, thereby providing a characterized circuit design; and optimizing the characterized circuit design.

11. A method according to claim 10 wherein the circuit design comprises a number of modules.

12. A method according to claim 11 wherein selected clock signals associated with a particular multi-cycle path control state devices in two or more of the number of modules.

13. A method according to claim 12 wherein selected ones of the clock signals are qualified type clock signals generated by gating a clock signal and a functional enable signal.

14. A method for optimizing a circuit design with an optimization tool, wherein the circuit design has a number of qualified clock signals therein, each of the number of qualified clock signals having a first cycle time and a first phase associated therewith and generated by the logical combination of at least a first signal having a second cycle time and a second signal having third cycle time, the method comprising the steps of:

identifying at least one of the number of qualified clock signals within the circuit design;

replacing selected ones of the identified qualified clock signals with a replacement clock signal, wherein the replacement clock signal has a cycle time and phase that is substantially equal to the first cycle time and the first phase of the corresponding qualified clock signal; and optimizing the circuit design using the replacement clock signal.

15. A method for optimizing a circuit design with an optimization tool, wherein the circuit design has a number of modules and each of the modules has a boundary, each of the modules further having a number of state devices, the circuit design having a source state device in a first module and a destination state device in a second module wherein the source state device provides data to the destination state device through a path, the source state device being clocked by a first clock signal having a clock pulse and the destination state device being clocked by a second clock signal having a number of clock pulses, the circuit design having a clock file associated therewith which includes an identification of the first clock signal and the second clock signal, the method comprising the steps of:

storing a number of timing constraints wherein the number of timing constraints associate a selected clock pulse of the second clock signal with the path, the selected clock pulse corresponding to the clock pulse of the second clock signal by which the data provided by the source state device is required to arrive at the destination state device; and replacing the second clock signal with a replacement clock signal, wherein the replacement clock signal corresponds to the selected clock pulse of the second clock signal.

16. A method according to claim 15 further comprising the step of:

replacing the identification of the second clock signal in the clock file with an identification of the replacement clock signal.

17. A method according to claim 15 further comprising the steps of:

determining a remote propagation time by determining a delay along the path from the source state device to the boundary of the second module;

determining a local propagation time by determining a delay along the path from the boundary of the second module to the destination state device;

determining a total allowed propagation time by determining a delay between a predetermined portion of the clock pulse of the first clock signal and a predetermined portion of the replacement clock signal;

determining an allowed local propagation time by subtracting the remote propagation time from the total allowed propagation time; and comparing the allowed local propagation time with the local propagation time.

18. A method for analyzing a circuit design, wherein the circuit design has a number of modules and each of the modules has a boundary, each of the modules further having a number of state devices, the circuit design having a source state device in a first module and a destination state device in a second module wherein the source state device provides data to the destination state device through a path, the source state device being clocked by a first clock signal having a clock pulse and the destination state device being clocked by a second clock signal having a number of clock pulses, the method comprising the steps of:

storing a number of timing constraints wherein the number of timing constraints associate a selected clock pulse of the second clock signal with the path, the selected clock pulse corresponding to the clock pulse of the second clock signal by which the data provided by the source state device is required to arrive at the destination state device;

determining a remote propagation time by determining a delay along the path from the source state device to the boundary of the second module;

determining a local propagation time by determining a delay along the path from the boundary of the second module to the destination state device;

determining a total allowed propagation time by determining a delay between a predetermined portion of the clock pulse of the first clock signal and a predetermined portion of the selected clock pulse of the second clock signal;

determining an allowed local propagation time by subtracting the remote propagation time from the total allowed propagation time; and comparing the allowed local propagation time with the local propagation time.

19. A method according to claim 18 further comprising the step of:

optimizing the portion of the path that lies in the second module if the local propagation time exceeds the allowed local propagation time.

20. A method according to claim 19 wherein the destination state device has a predetermined setup time associated therewith.

21. A method according to claim 20 wherein said determining step for determining the allowed local propagation time determines the allowed local propagation time by subtracting the remote propagation time and the predetermined setup time from the total allowed propagation time.

22. A method according to claim 20 wherein said optimizing step optimizes the circuit design if the local propagation time plus the predetermined setup time exceeds the allowed local propagation time by a predetermined amount.

23. A method according to claim 22 wherein each of said modules has a number of ports, and said path corresponds to an input port.

24. A method according to claim 23 wherein said storing step stores the selected pulse as an attribute of said input port.

25. A method according to claim 24 wherein said storing step stores the selected pulse as an attribute of said destination state device.

26. A method according to claim 18 further comprising the step of:

optimizing the portion of the path that lies in the first module if the local propagation time exceeds the allowed local propagation time.

27. A method according to claim 26 wherein the destination state device has a predetermined setup time associated therewith.

28. A method according to claim 27 wherein said determining step for determining the total allowed propagation time determines the allowed local propagation time by subtracting the remote propagation time and the predetermined setup time from the total allowed propagation time.

29. A method for optimizing a circuit design with an optimization tool, wherein the circuit design has a number of modules and each of the modules has a boundary, each of the modules further having a number of state devices, the circuit design having a source state device in a first module and a destination state device in a second module wherein the source state device provides data to the destination state device through a path, the source state device being clocked by a first clock signal having a clock pulse and the destination state device being clocked by a second clock signal having a number of clock pulses, the method comprising the steps of:

storing a number of timing constraints wherein the number of timing constraints associate a selected clock pulse of the second clock signal with the path, the selected clock pulse corresponding to the clock pulse of the second clock signal by which the data provided by the source state device is required to arrive at the destination state device;

determining a first propagation time by determining a delay along the path from the source state device to the boundary of the second module;

determining a second propagation time by determining a delay along the path from the boundary of the second module to the destination state device;

determining a total allowed propagation time by determining a delay between a predetermined portion of the clock pulse of the first clock signal and a predetermined portion of the selected clock pulse of the second clock signal;

adding the first propagation time and the second propagation time, thereby resulting in a total propagation time for the path;

comparing the total propagation time and the total allowed propagation time to determine if the total propagation time is within a predetermined specification of the total allowed propagation time;

allocating a desired first optimization amount to the first module and a desired second optimization amount to the second module if the total propagation time is not within the predetermined specification of the total allowed propagation time;

optimizing the portion of the path within the first module to reduce the first propagation time by the desired first optimization amount, if the total propagation time is not within the predetermined specification of the total allowed propagation time; and optimizing the portion of the path within the second module to reduce the second propagation time by the desired second optimization amount, if the total propagation time is not within the predetermined specification of the total allowed propagation time.

30. Apparatus for optimizing a circuit design having a number of multi-cycle paths therein, wherein each of the multi-cycle paths has a number of corresponding clock signals associated therewith, comprising:

identifying means for identifying at least one of the number of multi-cycle paths within the circuit design, each of the identified multi-cycle paths being controlled at least in part by a corresponding qualified clock signal, each of the qualified clock signals being generated by one or more gating blocks that logically combine a corresponding raw clock signal having a raw clock period and a phase with at least one other signal so that the corresponding qualified clock signal has a selectively extendable clock period and phase;

replacing means coupled to said identifying means for replacing selected ones of the qualified clock signals with a corresponding replacement clock signal, wherein each of the replacement clock signals have a clock period and a phase that corresponds to the selectively extendable clock period and phase of the corresponding qualified clock signals; and optimizing means coupled to said replacing means for optimizing the circuit design using selected replacement clock signals.

31. Apparatus according to claim 30 wherein said optimizing means further comprises characterizing means for characterizing the circuit design prior to the optimization of the circuit design.

32. Apparatus for optimizing a circuit design, wherein the circuit design has a number of modules and each of the modules has a boundary, each of the modules further having a number of state devices, the circuit design having a source state device in a first module and a destination state device in a second module wherein the source state device provides data to the destination state device through a path, the source state device being clocked by a first clock signal having a clock pulse and the destination state device being clocked by a second clock signal having a number of clock pulses, the method comprising the steps of:

storing means for storing a number of timing constraints wherein the number of timing constraints associate a selected clock pulse of the second clock signal with the path, the selected clock pulse corresponding to the clock pulse of the second clock signal by which the data provided by the source state device is required to arrive at the destination state device;

first determining means for determining a first propagation time by determining a delay along the path from the source state device to the boundary of the second module;

second determining means for determining a second propagation time by determining a delay along the path from the boundary of the second module to the destination state device;

third determining means for determining a total allowed propagation time by determining a delay between a predetermined portion of the clock pulse of the first clock signal and a predetermined portion of the selected clock pulse of the second clock signal;

adding means coupled to said first determining means and to said second determining means for adding the first propagation time and the second propagation time, thereby resulting in a total propagation time for the path;

comparing means coupled to said adding means and to said third determining means for comparing the total propagation time and the total allowed propagation time to determine if the total propagation time is within a predetermined specification of the total allowed propagation time;

allocating means coupled to said comparing means for allocating a desired first optimization amount to the first module and a desired second optimization amount to the second module if the total propagation time is not within the predetermined specification of the total allowed propagation time;

optimizing means coupled to said allocating means for optimizing the portion of the path within the first module to reduce the first propagation time by the desired first optimization amount, and for optimizing the portion of the path within the second module to reduce the second propagation time by the desired second optimization amount, if the total propagation time is not within the predetermined specification of the total allowed propagation time.

* * * * *

UNITED STATES PATENT AND TRADEMARK OFFICE
CERTIFICATE OF CORRECTION

PATENT NO. : 5,956,256
DATED : September 21, 1999
INVENTOR(S) : Rezek et al.

It is certified that error appears in the above-identified patent and that said Letters Patent is hereby corrected as shown below:

Column 20, line 16, change "clocks signal" to --clock signals--.

Signed and Sealed this

Seventeenth Day of October, 2000

Attest:

Q. TODD DICKINSON

*Attesting Officer*      *Director of Patents and Trademarks*